US009645254B2

(12) United States Patent
Nagamune

(10) Patent No.: US 9,645,254 B2
(45) Date of Patent: May 9, 2017

(54) DOSE DISTRIBUTION MEASURING DEVICE

(71) Applicant: NATIONAL INSTITUTE OF ADVANCED INDUSTRIAL SCIENCE AND TECHNOLOGY, Tokyo (JP)

(72) Inventor: Yasushi Nagamune, Ibaraki (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 14/838,896

(22) Filed: Aug. 28, 2015

(65) Prior Publication Data

US 2016/0245928 A1     Aug. 25, 2016

Related U.S. Application Data

(63) Continuation of application No. PCT/JP2014/056284, filed on Mar. 11, 2014.

(30) Foreign Application Priority Data

Mar. 12, 2013   (JP) .................................. 2013-049529

(51) Int. Cl.
     *G01T 1/169*      (2006.01)
     *G01T 1/02*      (2006.01)
     (Continued)

(52) U.S. Cl.
     CPC ................ *G01T 1/167* (2013.01); *G01T 1/02* (2013.01); *G01T 1/16* (2013.01); *G01T 7/00* (2013.01)

(58) Field of Classification Search
     CPC ......... G01T 1/02; G01T 1/169; G01T 1/2985; G01T 7/00
     See application file for complete search history.

(56) References Cited

U.S. PATENT DOCUMENTS

| 5,218,208 | A | 6/1993 | Augier et al. |
| 7,772,563 | B2 * | 8/2010 | Le Goaller ........... G01T 1/1648 250/390.09 |

(Continued)

FOREIGN PATENT DOCUMENTS

| JP | S6191180 U | 6/1986 |
| JP | S61274285 A | 12/1986 |

(Continued)

OTHER PUBLICATIONS

International Search Report dated May 16, 2014 for a corresponding PCT application No. PCT/JP2014/056284.

(Continued)

*Primary Examiner* — David Porta
*Assistant Examiner* — Faye Boosalis
(74) *Attorney, Agent, or Firm* — Typha IP LLC

(57) ABSTRACT

The present invention measures the dose distribution of radiation emitted from a measurement region. A dose distribution measuring device comprises a radiation detecting unit and a radiation varying unit disposed between the radiation detecting unit and a measurement region. A dose at the location of the radiation detecting unit is measured by the radiation detecting unit in a state in which the direction from which the radiation, which is to be measured by being varied by the radiation varying unit, is emitted from the measurement region onto the radiation detecting unit, is predetermined. The angular distribution of the radiation dose emitted on the radiation detecting unit from the measurement region is measured by identifying the direction and angle from which the radiation arrives from the measurement region to the radiation detecting unit and calculating the dose of the arriving radiation before varying with the radiation varying unit.

23 Claims, 24 Drawing Sheets

(51) Int. Cl.
*G01T 1/167* (2006.01)
*G01T 1/16* (2006.01)
*G01T 7/00* (2006.01)

(56) References Cited

U.S. PATENT DOCUMENTS

2008/0135767 A1 6/2008 Le Goaller et al.
2010/0308225 A1 12/2010 Nakamura
2012/0112087 A1 5/2012 Yokoi et al.

FOREIGN PATENT DOCUMENTS

| JP | H2-276985 A | 11/1990 |
| JP | H5-66275 A | 3/1993 |
| JP | H7-128451 A | 5/1995 |
| JP | H10-319122 A | 12/1998 |
| JP | 2001-305233 A | 10/2001 |
| JP | 2002-341036 A | 11/2002 |
| JP | 2007-10332 A | 1/2007 |
| JP | 2008-523405 A | 7/2008 |
| JP | 2010-266304 A | 11/2010 |
| JP | 2012-229945 A | 11/2012 |
| JP | 2013-036984 A | 2/2013 |
| WO | 2009/037781 A | 3/2009 |
| WO | 2011/001610 A1 | 1/2011 |

OTHER PUBLICATIONS

Written Opinion of the International Searching Authority dated May 16, 2014 for a corresponding PCT application No. PCT/JP2014/056284.

Japanese Office Action mailed on Nov. 8, 2016 for corresponding Japanese Application No. 2015-505484 with partial translation.

* cited by examiner

EACH POSITION ON MEASUREMENT REGION

DOSE DISTRIBUTION MEASURING DEVICE

CROSS REFERENCE TO RELATED APPLICATIONS

This application is based upon and claims the benefit of priority from PCT Application No. PCT/JP2014/056284, filed on Mar. 11, 2014, and the prior Japanese Patent Application No. 2013-049529, filed on Mar. 12, 2013, the entire contents of which are incorporated herein by reference.

FIELD

The present invention relates to a dose distribution measuring device and the like which measure the dose distribution of radiation emitted from an object or measurement region.

BACKGROUND

A dose distribution measuring device is a device for measuring the dose distribution of radiation emitted from an object or measurement region, the distribution of a radioactive substance contained in the object or measurement region, or the angular distribution of a radiation dose at a specific position, a so-called spatial dose.

A dose here generally means the type, energy, or count of radiation, the dose of radiation calculated in consideration of influence on the human body, or the radioactivity or content of a radioactive substance, and is expressed in a unit such as CPM (Count Per Minute), CPS (Count Per Second), CPH (Count Per Hour), Ci (Currie), Bq (Becquerel), Gy (Gray), rad (Rad), rem (Rem), Sy (Sievert), or Rm (Roentgen).

In addition, since there is no effective lens or mirror for radiation, a dose distribution measuring device including a pinhole, coded mask, or collimator has been conventionally used to measure the dose distribution of radiation emitted from an object or measurement region (see patent literatures; Japanese Patent Application Laid-Open No. 2001-305233, Japanese PCT National Publication No. 2008-523405 and Japanese Patent Application Laid-Open No. H10-319122.

However, in order to secure an effective contrast for a dose distribution, a pinhole, coded mask, or collimator is formed from a small hole formed in a thick metal plate made of a metal with a very high specific gravity such as lead. In addition, a radiation detecting two-dimensional array which measures a dose distribution is incorporated in a radiation shielding box having as its part a pinhole, coded mask, or collimator. This arrangement has posed problems that, for example, the overall apparatus is very heavy and it is difficult to, for example, move, install, and operate the apparatus.

In addition, it is necessary to detect a small amount of radiation having passed through the small hole formed in such a thick metal plate. In order to obtain a detection signal with a high SN ratio, therefore, it is necessary to integrate and measure detection signals over a long period of time.

Furthermore, owing to the structure in which the radiation detecting two-dimensional array is installed in the radiation shielding box, in order to obtain a spatial dose at a measurement position, it is necessary to separately perform measurement using a spatial dose measuring device.

SUMMARY

One of the problems that the present invention aims to solve is to provide a dose distribution measuring device which is much lighter as a whole than a conventional device and is easy to, for example, carry, install, and operate.

Another problem that the present invention aims to solve is to provide a dose distribution measuring device which can perform measurement with higher sensitivity and can obtain a detection signal with a higher SN ratio within a shorter period of time than conventional devices.

In addition, another problem that the present invention aims to solve is to provide a dose distribution measuring device which is not necessary to separately measure a spatial dose by using a spatial dose measuring device.

In order to achieve the purpose mentioned above, as one aspect of the present invention, there is disclosed a dose distribution measuring device characterized by comprising a radiation detecting unit and a radiation varying unit arranged between the radiation detecting unit and a measurement region, wherein a dose at a location of the radiation detecting unit is measured by the radiation detecting unit, in a state in which a direction of a radiation, of which a dose is to be varied by said radiation varying unit and measured, is predetermined and, a dose angular distribution of a radiation emitted from said measurement region toward said radiation detecting unit is measured, by way in which said direction or an angle, where said radiation arrives to said radiation detecting unit from said measurement region, is identified and a dose of said radiation before being varied by said radiation varying unit is calculated.

In addition, as another aspect of the present invention, in either of the above aspects, there is disclosed the dose distribution measuring device characterized in that the radiation varying unit comprises a second radiation varying unit and moving means for two-dimensionally moving the second radiation varying unit, wherein the moving means two-dimensionally moves the second radiation varying unit.

In addition, as another aspect of the present invention, in either of the above aspects, there is disclosed the dose distribution measuring device characterized in that the radiation varying unit comprises a second radiation varying unit and moving means for one-dimensionally moving the second radiation varying unit, wherein the radiation detecting unit comprises a radiation detecting one-dimensional array constituted by a plurality of linearly arranged radiation detectors, and the moving means one-dimensionally moves the second radiation varying unit.

In addition, as another aspect of the present invention, in either of the above aspects, there is disclosed the dose distribution measuring device characterized in that the radiation varying unit comprises a second radiation varying unit and a fixing unit, the radiation detecting unit comprises a radiation detecting two-dimensional array constituted by a plurality of planarly arranged radiation detectors, and the fixing unit fixes the second radiation varying unit.

In addition, as another aspect of the present invention, in either of the above aspects, there is disclosed the dose distribution measuring device characterized in that the radiation varying unit comprises a spatial modulating two-dimensional array constituted by a plurality of planarly arranged spatial modulators, and the spatial modulating two-dimensional array changes a dose of radiation detected by the radiation detecting unit.

In addition, as another aspect of the present invention, in either of the above aspects, there is disclosed the dose distribution measuring device characterized in that the radiation varying unit comprises a spatial modulating one-dimensional array constituted by a plurality of linearly arranged spatial modulators, the radiation detecting unit comprises a radiation detecting one-dimensional array, and the spatial modulating one-dimensional array changes a dose of radiation detected by the radiation detecting one-dimensional array.

In addition, as another aspect of the present invention, in either of the above aspects, there is disclosed the dose distribution measuring device characterized in that an effective size and an effective shape of the radiation varying unit are the same as or approximate to a size and a shape of a side surface, of the radiation detecting unit, which faces the second radiation varying unit.

In addition, as another aspect of the present invention, in either of the above aspects, there is disclosed the dose distribution measuring device characterized in that an effective size and an effective shape of the second radiation varying unit are the same as or approximate to a size and a shape of each radiation detector, of the radiation detecting two-dimensional array, which corresponds to a side surface, of the radiation detector, which faces the second radiation varying unit.

In addition, as another aspect of the present invention, in either of the above aspects, there is disclosed the dose distribution measuring device characterized in that an effective size and an effective shape of the second radiation varying unit are the same as or approximate to a size and a shape of a side surface, of the radiation detecting unit, which faces the second radiation varying unit.

In addition, as another aspect of the present invention, in either of the above aspects, there is disclosed the dose distribution measuring device characterized by further comprising a radiation shielding portion, wherein the second radiation detecting unit is covered by the radiation shielding portion except for a side surface, of the second radiation detecting unit, which faces the second radiation varying unit.

In addition, as another aspect of the present invention, in either of the above aspects, there is disclosed the dose distribution measuring device characterized by further comprising a radiation shielding portion, wherein the radiation detector is covered by the radiation shielding portion except for a side surface, of the radiation detector, which faces the second radiation varying unit.

In addition, as another aspect of the present invention, in either of the above aspects, there is disclosed the dose distribution measuring device characterized by further comprising a radiation shielding portion, wherein the radiation detector is covered by the radiation shielding portion except for a side surface, of the radiation detector, which faces the second radiation varying unit.

In addition, as another aspect of the present invention, in either of the above aspects, there is disclosed the dose distribution measuring device characterized by further comprising a radiation shielding portion, wherein the radiation detecting unit is covered by the radiation shielding portion except for a side surface, of the radiation detecting unit, which faces the spatial modulating two-dimensional array.

In addition, as another aspect of the present invention, in either of the above aspects, there is disclosed the dose distribution measuring device characterized by further comprising a radiation shielding portion, wherein each detector of the radiation detecting one-dimensional array is covered by the radiation shielding portion except for a side surface, of each detector, which faces the spatial modulating one-dimensional array.

In addition, as another aspect of the present invention, in either of the above aspects, there is disclosed the dose distribution measuring device characterized by further comprising one or both of a visible light camera and an infrared camera, wherein one or both of a visible light image and an infrared image of the measurement region are captured.

In addition, as another aspect of the present invention, in either of the above aspects, there is disclosed the dose distribution measuring device characterized by further comprising a distance meter, wherein a distance between the radiation detecting unit and the measurement region is measured, and a dose distribution of the measurement region is obtained by calculating a dose of radiation emitted from each position on the measurement region.

In addition, as another aspect of the present invention, in either of the above aspects, there is disclosed the dose distribution measuring device characterized by further comprising a radiation spectrum analyzing unit, wherein a radioactive substance contained at each position on the measurement region is identified.

In addition, as another aspect of the present invention, in either of the above aspects, there is disclosed the dose distribution measuring device characterized by further comprising a display unit, the display unit combining the dose distribution and one or both of the visible light image and the infrared image and displaying a composite image.

In addition, as another aspect of the present invention, in either of the above aspects, there is disclosed the dose distribution measuring device characterized by further comprising a radiation spectrum analyzing unit, wherein a radioactive substance contained at each position on the measurement region is identified, and the identified radioactive substance name is displayed on the composite image.

In addition, as another aspect of the present invention, in either of the above aspects, there is disclosed the dose distribution measuring device characterized by further comprising a GPS, wherein a measurement position is measured.

A dose distribution measuring device according to the present invention is much lighter than a conventional device, and hence is easy to, for example, carry, install, and operate. Therefore, using the dose distribution measuring device according to the present invention can easily and accurately measure the dose distribution of radiation emitted from an object or measurement region.

In addition, a dose distribution measuring device according to the present invention has much higher sensitivity, and hence can measure a detection signal with a higher SN ratio or a dose distribution within a shorter period of time than conventional devices.

Furthermore, using a dose distribution measuring device according to the present invention will obviate the necessity to separately measure a spatial dose by using a spatial dose measuring device.

Moreover, one of the problems that the present invention aims to solve is to provide a dose distribution measuring device which is not necessary to separately measure a spatial dose by using a spatial dose measuring device.

DESCRIPTION OF EMBODIMENTS

Figure 1A:
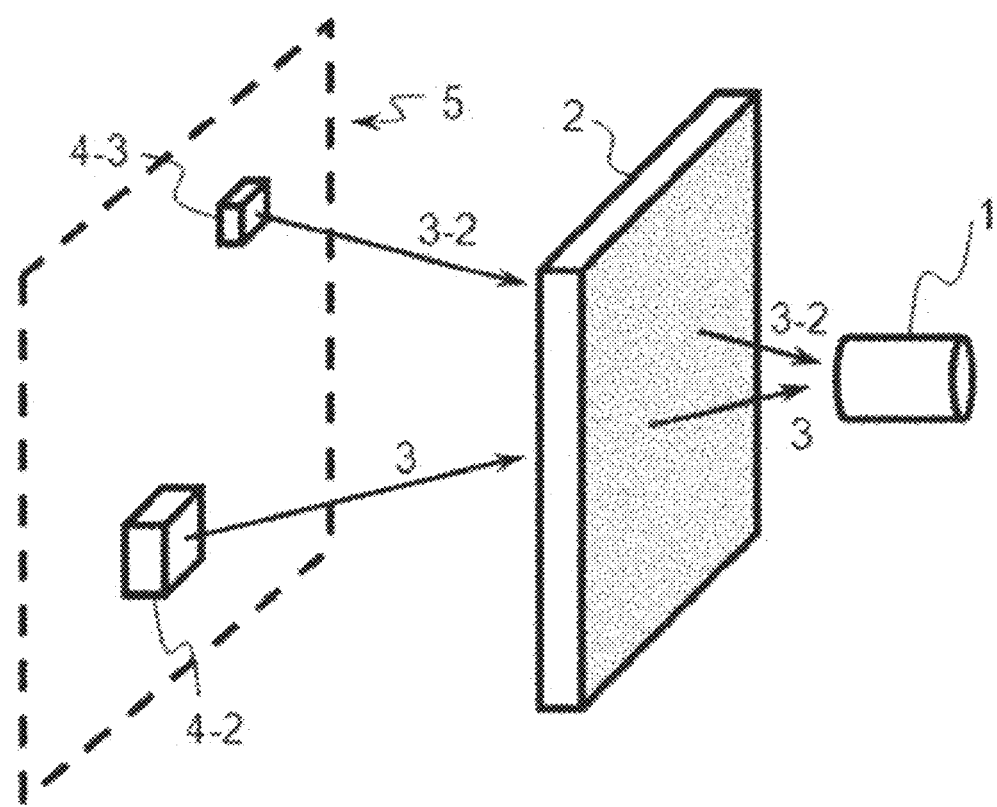
FIG. 1A schematically shows a dose distribution measuring device according to an embodiment of the present invention.

Embodiments and examples according to the present invention will be described below with reference to the accompanying drawings. Note, however, that the present invention is not limited to the contents of the following description. In addition, a repetitive description will not sometimes be made.

(Outline of the Present Invention)

An outline of the present invention will be described.

A dose distribution measuring device according to an embodiment of the present invention comprises a radiation detecting unit and a radiation varying unit arranged between the radiation detecting unit and a measurement region. A dose at the location of the radiation detecting unit is measured by the radiation detecting unit, in a state in which the direction of a radiation, of which a dose is to be varied by said radiation varying unit and measured, is predetermined and, a dose angular distribution of a radiation emitted from said measurement region toward said radiation detecting unit is measured, by way in which said direction or an angle, where said radiation arrives to said radiation detecting unit from said measurement region, is identified and a dose of said radiation before being varied by said radiation varying unit is calculated.

In this case, the radiation detecting unit is formed from an element which detects alpha rays, beta rays, X-rays, or gamma rays emitted from a radioactive substance, and preferably detects radiation by an ionization chamber scheme, proportional counter scheme, Geiger-Mueller counter scheme, semiconductor scheme, scintillation scheme, or the like.

In addition, the radiation varying unit preferably emits radiation in a different state, e.g., a different dose of radiation, in a predetermined direction, with respect to radiation entering the radiation varying unit.

Note that "radiation in a different state" is, for example, a different dose of radiation, a different type of radiation, a different energy of radiation, a different power of an electromagnetic wave, a different type of electromagnetic wave, or a different energy of an electromagnetic wave with respect to radiation entering the radiation varying unit. The radiation varying unit preferably emits, for example, a different dose of radiation, a different type of radiation, a different energy of radiation, a different power of an electromagnetic wave, a different type of electromagnetic wave, or a different energy of an electromagnetic wave, in a predetermined direction, with respect to radiation entering the radiation varying unit.

Note that the radiation varying unit is preferably formed from a radiation scattering material, radiation absorbing material, or the like.

Note that a radiation scattering material is preferably a material containing a metal having a large atomic weight and a large specific gravity, such as lead. In addition, a radiation absorbing material is preferably a material containing hydrogen or the like having a small atomic weight, such as water. Furthermore, a radiation scattering material or radiation absorbing material is preferably a scintillation material.

Note that since very many types of interactions exist between radiation and materials and have high energy dependence, interactions of both scattering and absorption of radiation can be regarded to occur at a given ratio. In this case, such scattering and absorption of radiation are mainly caused by a photoelectric effect, Compton scattering, or electron pair creation.

It is therefore preferable to select, as a member of the radiation varying unit, a member which efficiently outputs radiation in a different state, e.g., a different dose of radiation, in a predetermined direction, with respect to incident radiation by using a table of energy dependences of these interactions such as a so-called mass attenuation coefficient table.

Consider, for example, gamma rays. The following types of gamma rays exist as gamma rays emerging from the radiation varying unit with respect to gamma rays entering the radiation varying unit: transmitted gamma rays, once forward transmitted gamma rays, multiple forward scattered gamma rays, once backward scattered gamma rays, and multiple backward scattered gamma rays. Of these types of gamma rays, transmitted gamma rays are preferably used as gamma rays emerging in a predetermined direction.

The radiation varying unit is preferably formed by selecting a member which outputs transmitted gamma rays and setting the thickness of the member so as to make the dose of transmitted gamma rays different from that of incident gamma rays, for example, minimize the dose of transmitted gamma rays.

Note that increasing the length of the radiation varying unit along the incident direction of incident gamma rays can easily reduce the dose of transmitted gamma rays relative to incident gamma rays. In addition, it is possible to properly adjust the detection sensitivity of radiation and dynamic range of detection by preparing radiation varying units having different lengths and interchanging them so as to change the dose of transmitted gamma rays.

Figure 1B:
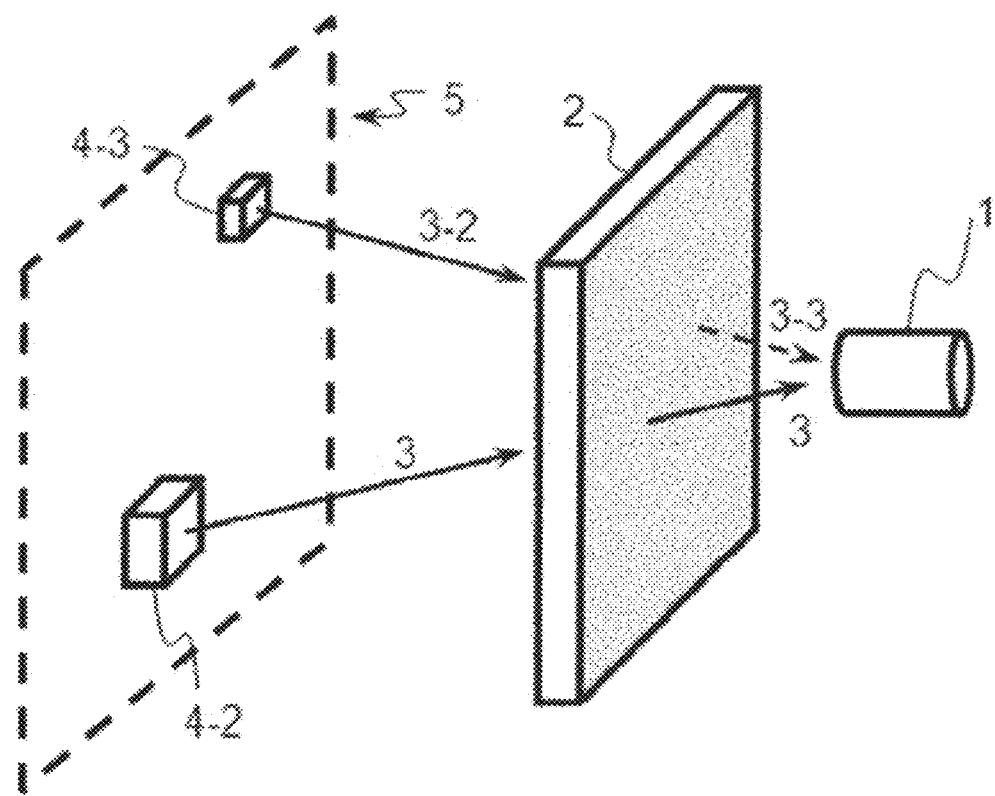
FIG. 1B schematically shows a dose distribution measuring device according to an embodiment of the present invention.
Figure 1C:
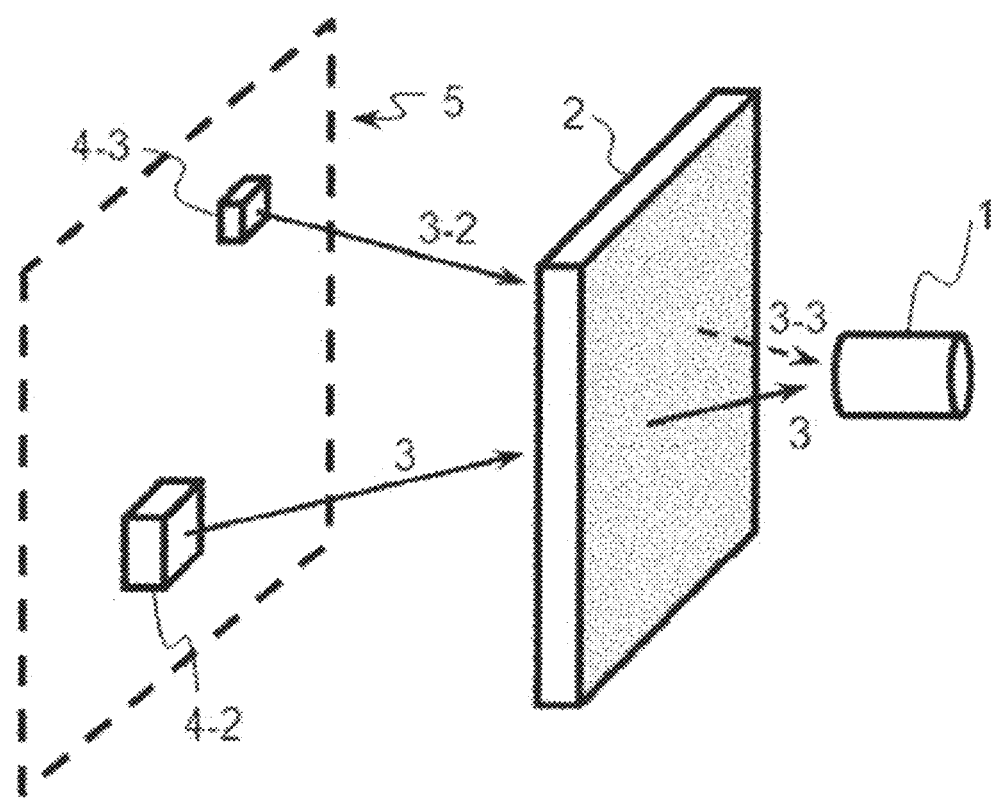
FIG. 1C schematically shows a dose distribution measuring device according to an embodiment of the present invention.

FIGS. 1A, 1B and 1C show the structure of a dose distribution measuring device according to an embodiment of the present invention. As shown in FIGS. 1A, 1B and 1C, a radiation varying unit 2 is arranged between a radiation detecting unit 1 and a measurement region 5. Assume that in this case, objects 4-2 and 4-3 which emit radiation are located in the measurement region 5.

First of all, as shown in FIG. 1A, the radiation varying unit 2 is set to transmit, without change, radiation 3 emitted from the object 4-2 toward the radiation detecting unit 1 and radiation 3-2 emitted from the object 4-3 toward the radiation detecting unit 1, and the radiation detecting unit 1 measures a dose at the location of the radiation detecting unit 1.

Then, as shown in FIG. 1B, the radiation varying unit 2 is set to transmit, without change, the radiation 3 and output, with respect to the radiation 3-2, radiation 3-3 in a different state compared with the radiation 3-2, e.g., a different dose of radiation as compared with the radiation 3-2, in the same direction as that of the radiation 3-2, and the radiation detecting unit 1 measures a dose at the location of the radiation detecting unit 1.

In addition, as shown in FIG. 10, the radiation varying unit 2 is set to transmit, without change, the radiation 3-2 and output, with respect to the radiation 3, radiation 3-1 in a different state as compared with the radiation 3, e.g., a different dose of radiation as compared with the radiation 3, in the same direction as that of the radiation 3, and the radiation detecting unit 1 measures a dose at the location of the radiation detecting unit 1.

As described above, the radiation detecting unit 1 measures a dose at the location of the radiation detecting unit 1 in accordance with different set states of the radiation varying unit 2 as shown in FIGS. 1A, 1B and 1C. In other words, the radiation detecting unit 1 can measure a dose at the location of the radiation detecting unit 1 in a state in which a specific direction from which radiation, which is to be measured by being varied in accordance with the set state of the radiation varying unit 2, arrives is predetermined.

This indicates that it is possible to calculate the dose of radiation arriving at the location of the radiation detecting unit 1 upon identifying a direction or angle from which radiation arrives at the location of the radiation detecting unit 1 before being varied by the radiation varying unit 2. That is, it is possible to measure the angular distribution of a radiation dose emitted from a measurement region to the radiation detecting unit.

Although the objects 4-2 and 4-3 emit radiation in all directions, only some rays of radiation is drawn for the sake of simplicity.

In the state shown in FIG. 1A, the radiation detecting unit 1 detects radiation from all directions without change. For this reason, in the state shown in FIG. 1A, the radiation detecting unit 1 detects a spatial dose at the location of the radiation detecting unit 1.

As described above, the dose distribution measuring device according to the present invention can measure the angular distribution of a radiation dose emitted from a measurement region to the radiation detecting unit.

Figure 2A:
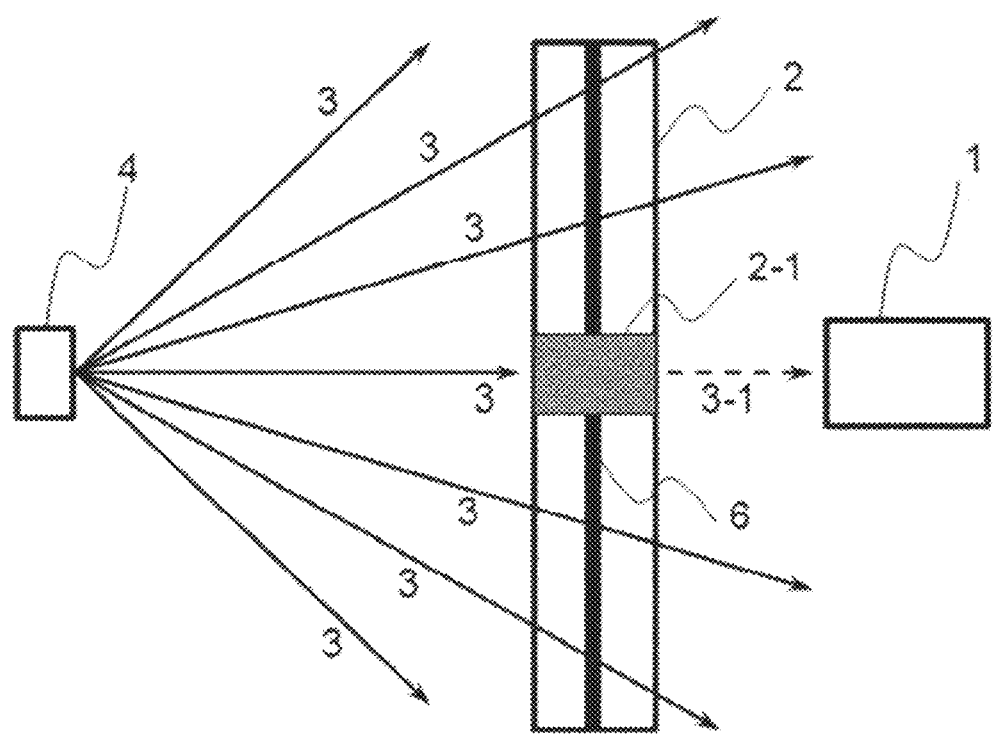
FIG. 2A schematically shows a dose distribution measuring device according to the embodiment of the present invention.
Figure 2B:
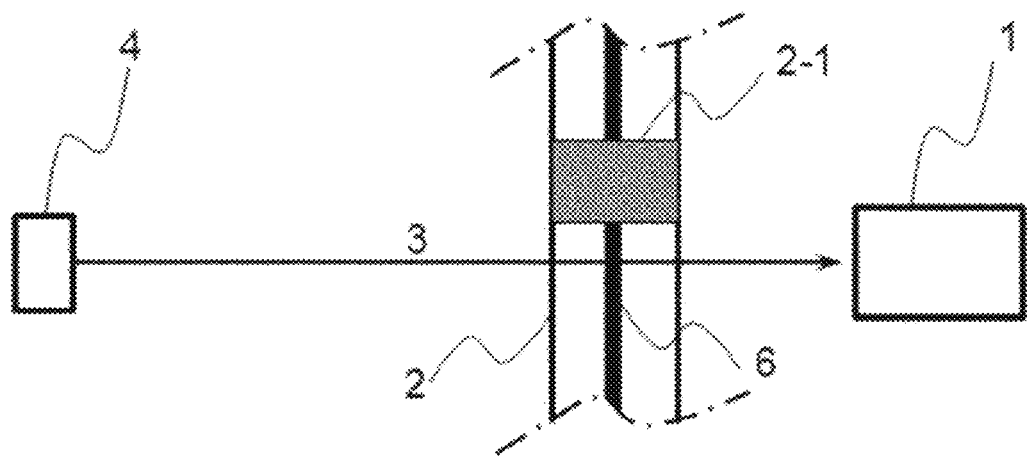
FIG. 2B schematically shows a dose distribution measuring device according to the embodiment of the present invention.

FIGS. 2A and 2B show the structure of a dose distribution measuring device according to the embodiment of the present invention. As shown in FIGS. 2A and 2B, in this arrangement, the radiation varying unit 2 including a second radiation varying unit 2-1 and a moving means 6 is arranged between the radiation detecting unit 1 and an object 4 which emits the radiation 3.

In this case, as shown in FIG. 2A, when the second radiation varying unit 2-1 is arranged on an axis connecting the radiation detecting unit 1 and the object 4 which emits the radiation 3, the radiation detecting unit 1 is set to detect the radiation 3-1 in a different state as compared with the radiation 3, e.g. a different dose of radiation as compared with the radiation 3, emitted from the object 4 toward the radiation detecting unit 1. Although the object 4 emits radiation in all directions, only some rays of radiation is drawn for the sake of simplicity. In addition, although rays of radiation emitted from the objects are indicated by the same numbers for the sake of simplicity, rays of radiation are sometimes indicated by the same scheme in the following description.

When the second radiation varying unit 2-1 shown in FIG. 2B moves outside from an axis connecting the object 4 to the radiation detecting unit 1, the radiation detecting unit 1 is set to detect, without change, the radiation 3 emitted from the object 4 toward the radiation detecting unit 1 and output a detection signal. For the sake of simplicity, FIG. 2B shows only radiation, of the radiation 3 in FIG. 2A, which is emitted from the object 4 toward the radiation detecting unit 1.

Figure 3A:
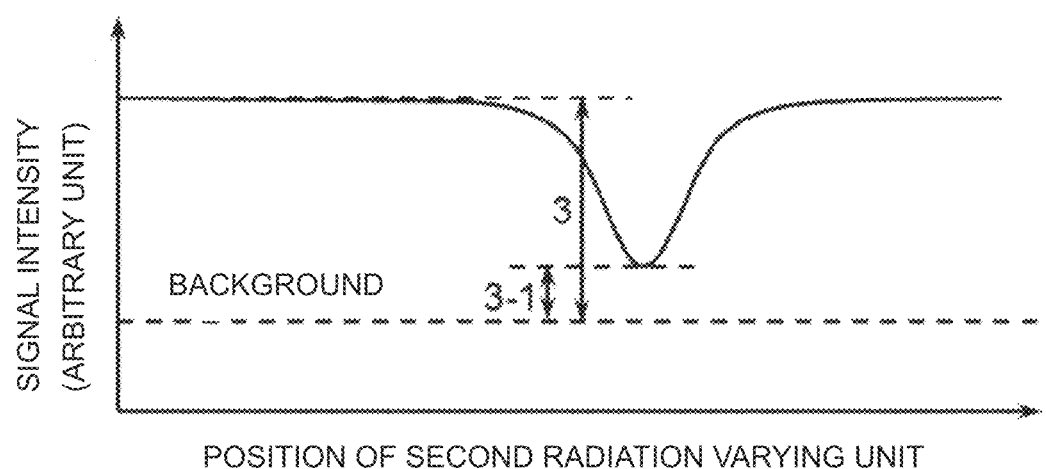
FIG. 3A each shows an example of a signal amount distribution obtained in the embodiment of the present invention.

Therefore, when the second radiation varying unit 2-1 moves downward along a predetermined line so as to pass through the axis connecting the radiation detecting unit 1 to the object 4, the radiation detecting unit 1 outputs a signal like that shown in FIG. 3A depending on the degree of detection of radiation by the radiation detecting unit 1. Note that the predetermined line may be a straight line or curve.

In this case, the depth of a dip structure or valley-like curve of the signal curve in FIG. 3A corresponds to the dose of radiation, of the dose of the radiation 3 emitted from the object 4 to the location of the radiation detecting unit 1, which is varied by the second radiation varying unit 2-1.

Figure 3B:
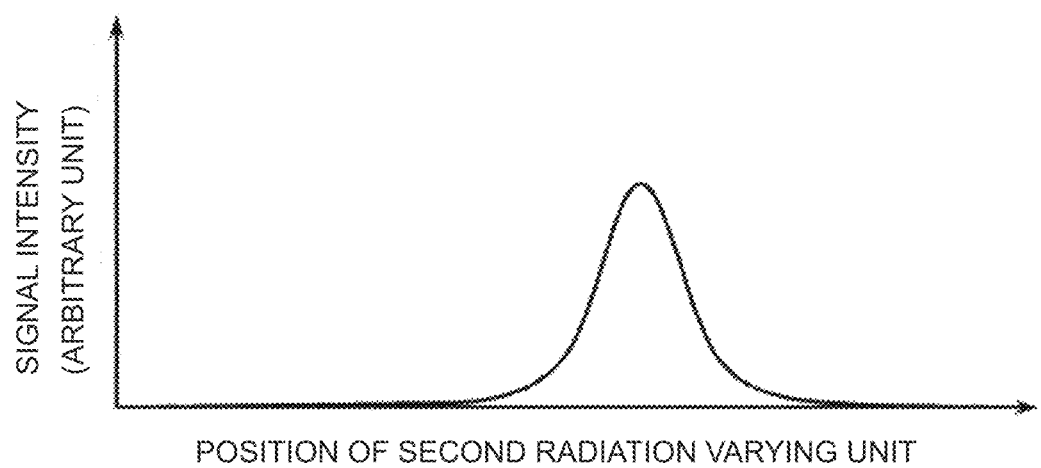
FIG. 3B each shows an example of a signal amount distribution obtained in the embodiment of the present invention.

Therefore, the height of the peak structure (hill) of the curve in FIG. 3B obtained by subtracting a signal intensity represented by the curve in FIG. 3A from a signal intensity output from the radiation detecting unit 1 in the absence of the second radiation varying unit 2-1 and multiplying the resultant value by the reciprocal of the ratio of a dose varied by the second radiation varying unit 2-1 indicates the dose of radiation emitted from the object 4 to the location of the radiation detecting unit 1. In this case, the curve in FIG. 3B represents the dose of radiation emitted from a one-dimensional measurement region to the location of the radiation detecting unit 1 as a function of the location of the second radiation varying unit 2-1.

Figure 3C:
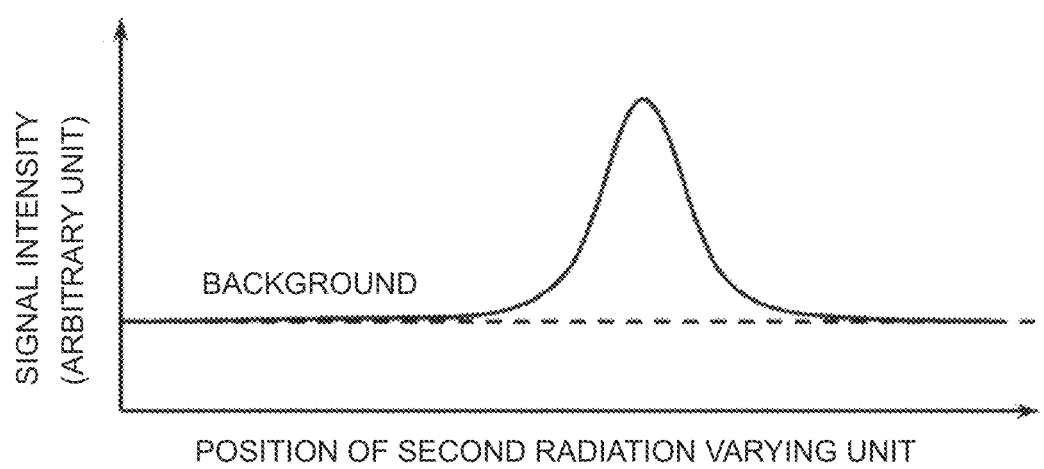
FIG. 3C each shows an example of a signal amount distribution obtained in the embodiment of the present invention.

Note that a dose at the location of the radiation detecting unit 1 in the absence of the object 4 may be added, as background information, to the signal intensity represented by the curve in FIG. 3B, and the result may be indicated as shown in FIG. 3C. Each signal intensity may be indicated linearly or logarithmically. In addition, various display methods are conceivable.

Note that increasing the length of the second radiation varying unit 2-1 along the direction of radiation entering the radiation detecting unit 1 can easily reduce the dose of the radiation 3-1. For example, the value of the radiation 3-1 in FIG. 3A can be reduced to near 0, and hence it is possible to easily obtain a signal with high contrast.

In addition, the distance between the radiation detecting unit 1 and each position on a one-dimensional measurement region is measured, and the dose of radiation emitted from each position on the one-dimensional measurement region is calculated in consideration of the fact that the dose decreases in inverse proportion to the square of the distance from the radiation source. This makes it possible to generate a dose distribution curve of the one-dimensional measurement region.

When, for example, the one-dimensional measurement region is linear and the radiation varying unit is moved along a straight line parallel to the straight line at the midpoint of a line connecting the straight line to the radiation detecting unit, a curve represented by doubling the abscissa of FIG. 3B represents the dose distribution curve of radiation emitted from each position on the one-dimensional measurement region.

Figures 4, 5:
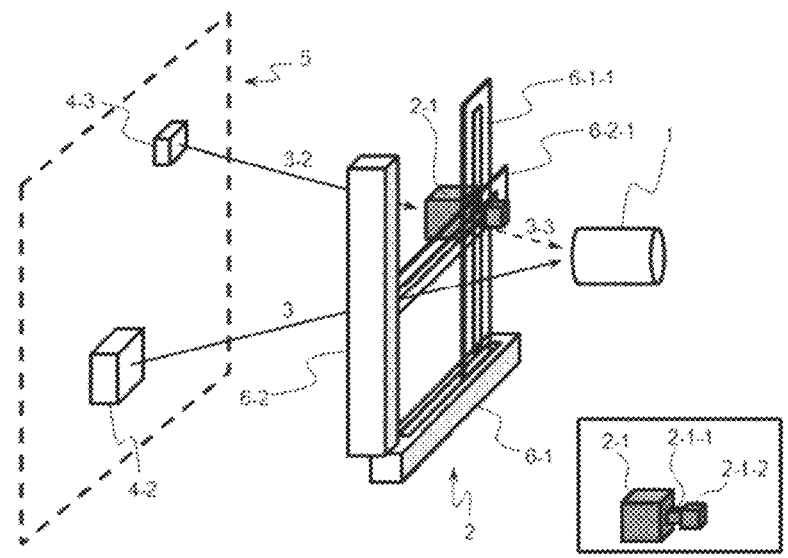
FIG. 4 is a schematic view of a structure of Example 1 of the present invention.
FIG. 5 is a graph showing an example of a measuring method according to the embodiment of the present invention.

Furthermore, assume that the second radiation varying unit 2-1 is two-dimensionally moved along a predetermined plane intersecting an axis connecting the radiation detecting unit 1 to the object 4 or a two-dimensional measurement region so as to pass through the axis, and the radiation detecting unit 1 measures the degree of detection of radiation (see FIG. 4). In this case, likewise, it is possible to generate a dose distribution curve group (see FIG. 6B) and dose distribution chart (see FIG. 20) of radiation emitted from an object or two-dimensional measurement region to the location of the radiation detecting unit 1. Note that the predetermined plane may be a flat or curved plane.

Example 1

FIG. 4 shows Example 1 of the dose distribution measuring device according to the present invention. As shown in FIG. 4, a radiation varying unit 2 is arranged between a radiation detecting unit 1 and objects 4-2 and 4-3 or a measurement region 5. A second radiation varying unit 2-1 of the radiation varying unit 2 includes a constricted portion 2-1-1 and a stopper 2-1-2, and is configured such that the constricted portion 2-1-1 is inserted into both a slit of a holding portion 6-1-1, which can be moved by a horizontal moving portion 6-1, and a slit of a holding portion 6-2-1, which can be moved by a vertical moving portion 6-2. That is, the second radiation varying unit 2-1 can be two-dimensionally moved along a plane between the radiation detecting unit 1 and the measurement region 5 by causing the horizontal moving portion 6-1 to move the holding portion 6-1-1 and causing the vertical moving portion 6-2 to move the holding portion 6-2-1. For the sake of simplicity, FIG. 4 shows only some rays of radiation.

Note that it is possible to measure two-dimensionally moving of the second radiation varying unit 2-1 repeatedly by moving or scanning the second radiation varying unit 2-1 as indicated by the dashed line in FIG. 5. However, the second radiation varying unit 2-1 may be moved according to a so-called raster scan, which is used for display on a general monitor. Alternatively, when, for example, it is necessary to measure a specific region in detail, a so-called vector scan, which is used for electron beam lithography and the like, may be used. Note that repeatedly measuring and integrating signals will obtain a signal having a high SN ratio.

In addition, the holding portion 6-1-1 and the holding portion 6-2-1 in FIG. 4 are preferably members which do not change radiation as much as possible.

Figure 6A:
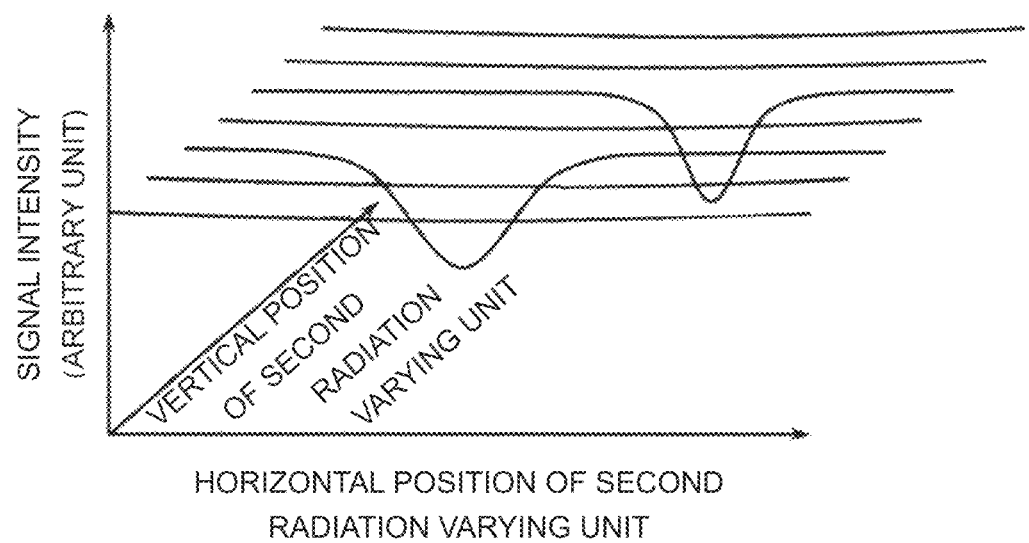
FIG. 6A shows an example of a signal amount distribution obtained in the embodiment of the present invention.
Figure 6B:
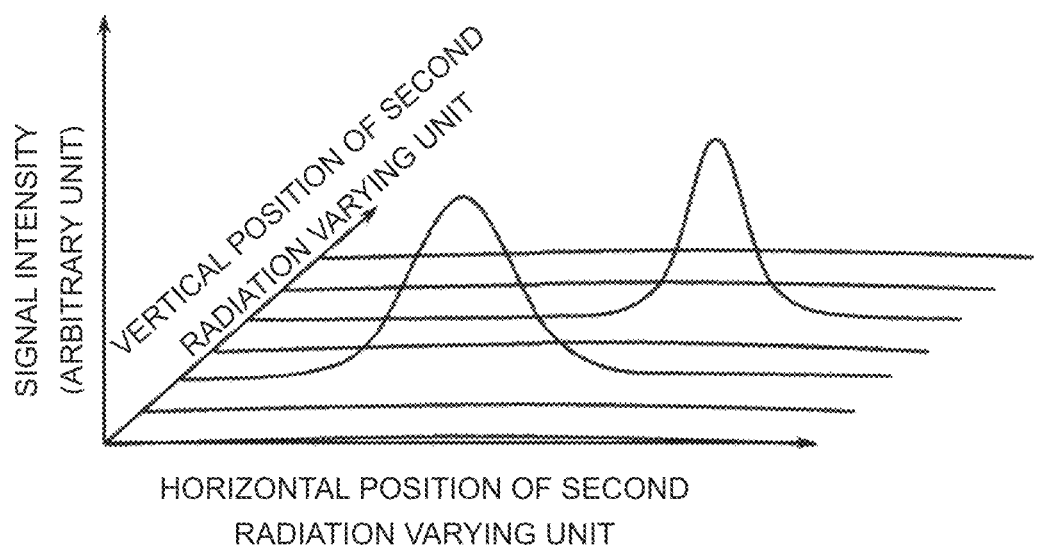
FIG. 6B shows an example of a signal amount distribution obtained in the embodiment of the present invention.

FIG. 6A shows an example of the signal intensity of radiation detected by the radiation detecting unit 1 when performing a raster scan, i.e., continuously moving the second radiation varying unit 2-1 in the horizontal direction and intermittently moving it in the vertical direction in FIG. 4. In this case, FIG. 6A shows dip structures respectively corresponding to rays of radiation emitted from the objects 4-2 and 4-3 in FIG. 4. FIG. 6B shows each curve obtained by subtracting the signal intensity represented by each curve in FIG. 6A from the signal intensity output from the radiation detecting unit 1 in the absence of the second radiation varying unit 2-1 and multiplying the resultant value by the reciprocal of the ratio of a dose changed by the second radiation varying unit 2-1. In this case, FIG. 6B shows peak structures respectively corresponding to rays of radiation emitted from the objects 4-2 and 4-3 in FIG. 4.

In this case, FIG. 6B shows a change in the dose of radiation emitted to the location of the radiation detecting unit 1 as a function of the location of the second radiation varying unit 2-1. In addition, the dose distribution of the measurement region 5 can be expressed by converting two abscissas in FIG. 6B in correspondence with the respective positions on the measurement region 5. Note that this distribution may be displayed upon addition of a radiation dose as background information.

Note that referring to FIG. 4, the signal intensity of radiation detected by the radiation detecting unit 1 in the absence of the second radiation varying unit 2-1 corresponds to a spatial dose at a measurement position.

In this manner, Example 1 of the dose distribution measuring device according to the present invention can measure the dose distribution of a measurement region. Note that it is possible to broaden a measurement range or increase the spatial resolution of a dose distribution by reducing the second radiation varying unit and the radiation detecting unit and increasing the moving angle of the second radiation varying unit with respect to the radiation detecting unit. In addition, it is possible to downsize the device by reducing the radiation varying unit, the second radiation varying unit, and the radiation detecting unit.

Although FIG. 4 shows a case in which the radiation detecting unit 1 is fixed, and the second radiation varying unit 2-1 is moved along a predetermined plane, the radiation detecting unit 1 may be moved along a predetermined plane while the second radiation varying unit 2-1 is fixed. Alternatively, both the second radiation varying unit 2-1 and the radiation detecting unit 1 may respectively be moved along predetermined planes.

Example 2

Figure 7A:
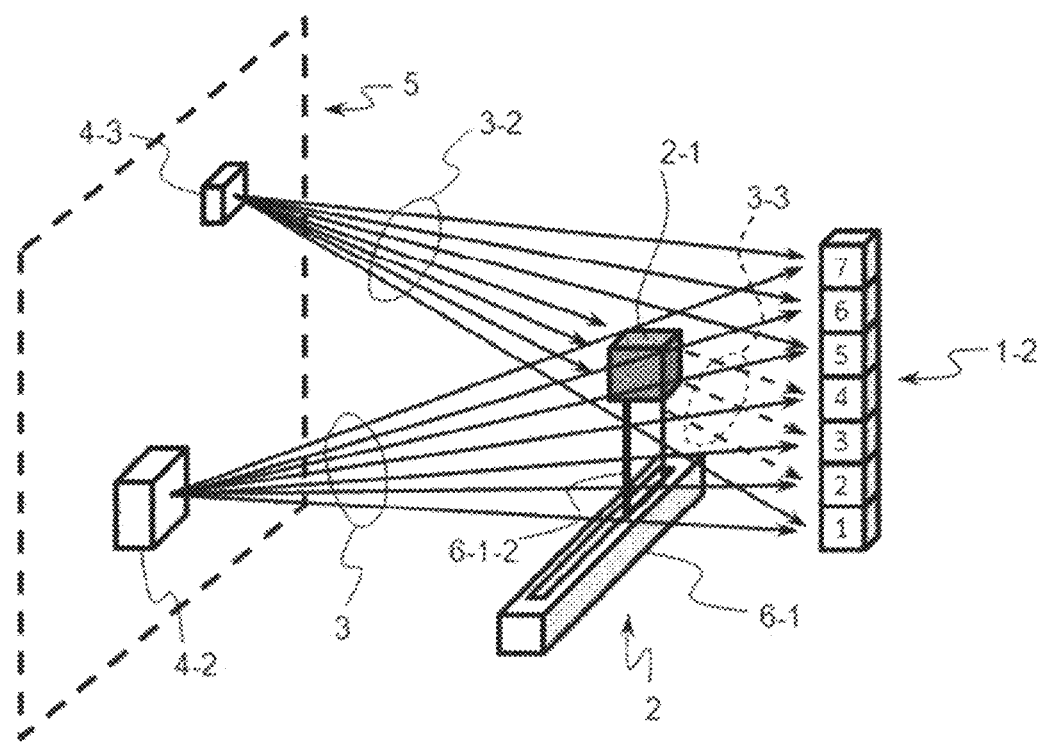
FIG. 7A schematically shows a structure of Example 2 of the present invention.
Figure 7B:
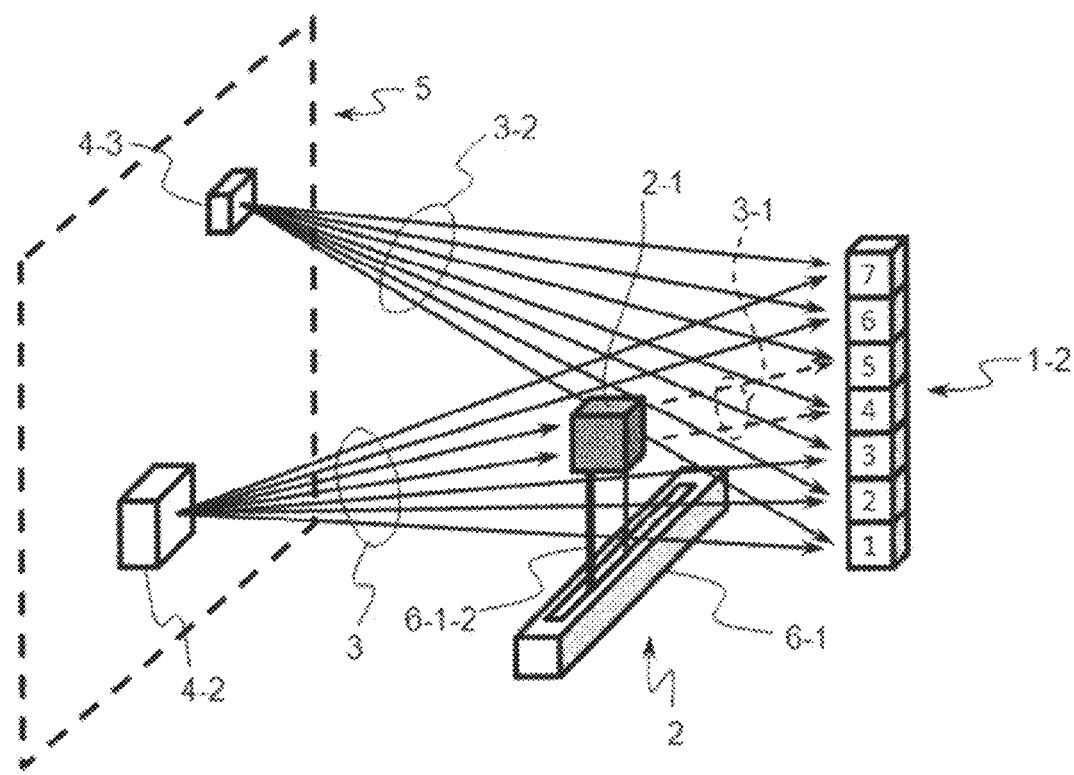
FIG. 7B schematically shows a structure of Example 2 of the present invention.

FIGS. 7A and 7B show Example 2 of the dose distribution measuring device according to the present invention. As shown in FIGS. 7A and 7B, a radiation varying unit 2 is arranged between a radiation detecting one-dimensional array 1-2 having a plurality of radiation detecting units (the first to seventh radiation detecting units) linearly arranged in the vertical direction and objects 4-2 and 4-3 or a measurement region 5. In addition, a second radiation varying unit 2-1 of the radiation varying unit 2 is configured to be supported by a holding unit 6-1-2 which can be moved in the horizontal direction by a horizontal moving unit 6-1.

That is, the second radiation varying unit 2-1 can be moved between the radiation detecting one-dimensional array 1-2 and an object or measurement region in a direction perpendicular to the radiation detecting one-dimensional array 1-2. For the sake of simplicity, FIGS. 7A and 7B show only some rays of radiation.

Note that the holding unit 6-1-2 is preferably a member which does not change radiation as much as possible.

Figure 8A:
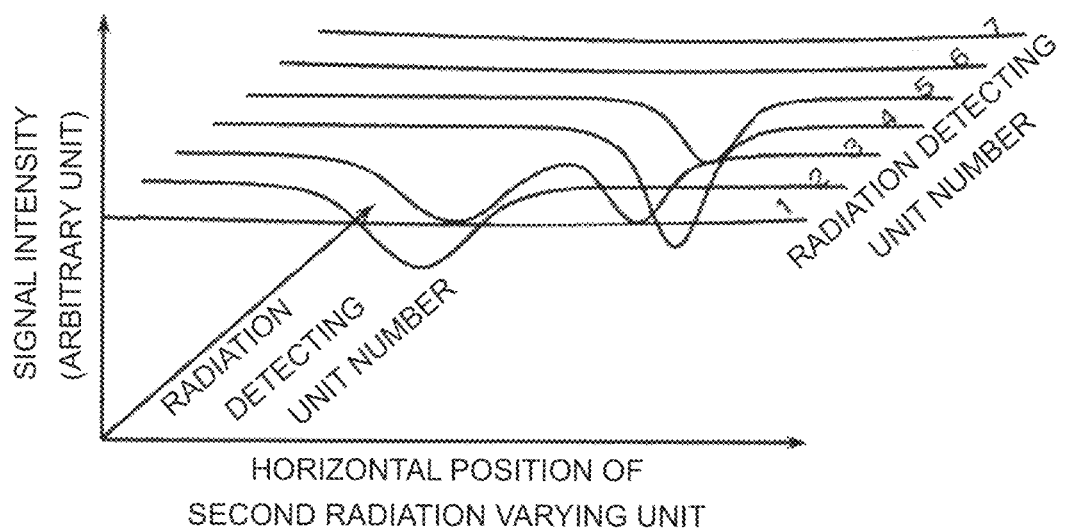
FIG. 8A shows an example of a signal amount distribution obtained in the embodiment of the present invention.
Figure 8B:
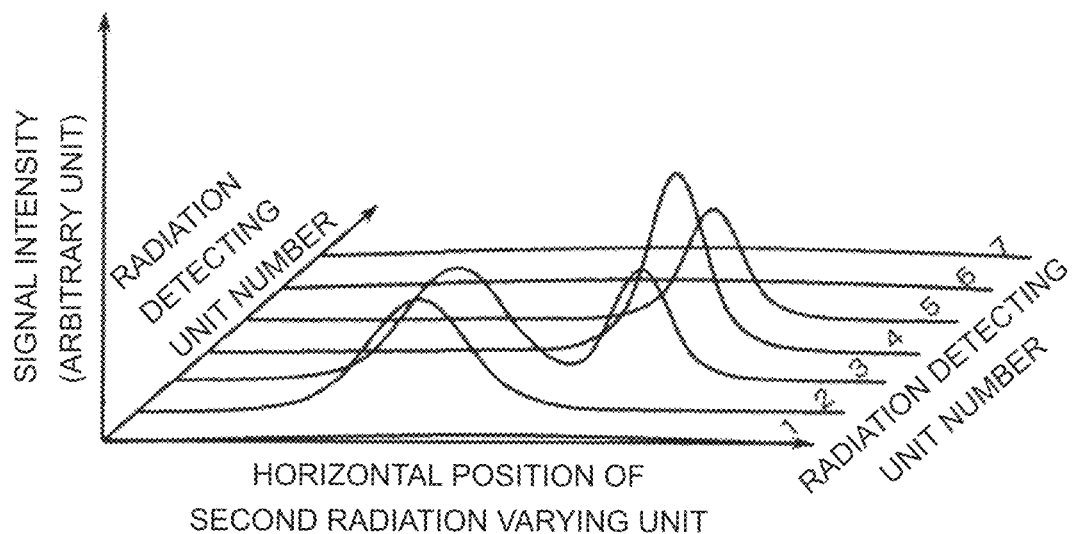
FIG. 8B shows an example of a signal amount distribution obtained in the embodiment of the present invention.

Each curve in FIG. 8A represents an example of plotting the signal intensity of radiation detected by a corresponding one of a plurality of radiation detecting units (the first to seventh radiation detecting units) constituting the radiation detecting one-dimensional array 1-2 as a function of the horizontal location of the second radiation varying unit 2-1. In addition, each curve in FIG. 8B shows a curve obtained by subtracting a signal intensity represented by each curve in FIG. 8A from the signal intensity of radiation detected by a corresponding one of the plurality of radiation detecting units constituting the radiation detecting one-dimensional array 1-2 in the absence of the second radiation varying unit 2-1 and multiplying the resultant value by the reciprocal of the ratio of a dose changed by the second radiation varying unit 2-1. In this case, FIG. 8B shows a dose distribution obtained by representing the dose distribution of radiation emitted from the measurement region 5 to the location of the radiation detecting unit 1 as a function of the location of the second radiation varying unit 2-1. In addition, a dosed distribution of the measurement region 5 can be represented by converting the abscissas of the measurement region 5 in accordance with the respective positions on the measurement region 5.

Note that referring to FIGS. 7A and 7B, the signal intensity of radiation detected by each radiation detecting unit of the radiation detecting one-dimensional array 1-2 in the absence of the second radiation varying unit 2-1 corresponds to a spatial dose at the measurement position of each radiation detecting unit.

In this manner, Example 2 of the dose distribution measuring device according to the present invention can measure the dose distribution of a measurement region. Note that it is possible to broaden a measurement range or increase the spatial resolution of a dose distribution by reducing the radiation varying unit, the second radiation varying unit, and the radiation detecting unit and increasing the number of radiation detecting units and the moving angle of the second radiation varying unit with respect to the radiation detecting one-dimensional array. In addition, it is possible to downsize the device by reducing the radiation varying unit, the second radiation varying unit, and the radiation detecting unit.

Although FIGS. 7A and 7B show a case in which the radiation detecting one-dimensional array 1-2 is fixed, and the second radiation varying unit 2-1 is moved along a predetermined line. However, the radiation detecting one-dimensional array 1-2 may be moved along a predetermined line while the second radiation varying unit 2-1 is fixed. Alternatively, both the second radiation varying unit 2-1 and the radiation detecting one-dimensional array 1-2 may be respectively moved along predetermined planes.

Example 3

Figure 9:
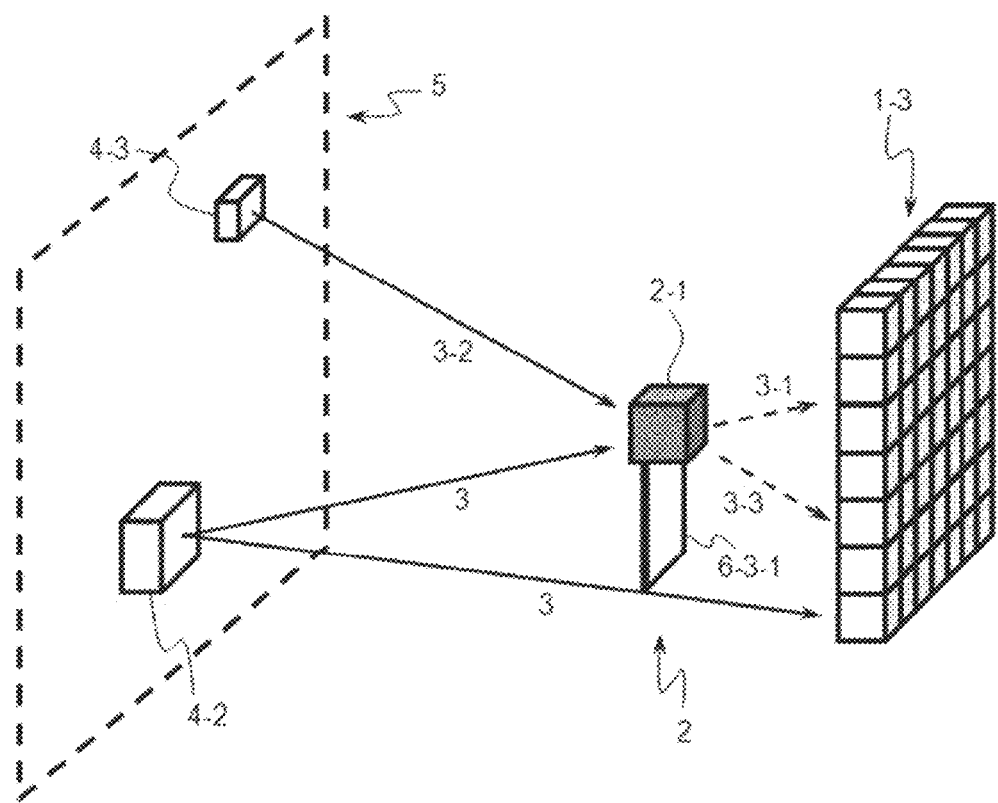
FIG. 9 is another schematic view of a structure of Example 3 of the present invention.

FIG. 9 shows Example 3 of the dose distribution measuring device according to the present invention. As shown in FIG. 9, a radiation varying unit 2 is arranged between a radiation detecting two-dimensional array 1-3 having a plurality of planarly arranged radiation detecting units and objects 4-2 and 4-3 or a measurement region 5. In addition, the radiation varying unit 2 is configured to make a holding unit 6-3-1 hold a second radiation varying unit 2-1. Note that the second radiation varying unit 2-1 may be fixed at a predetermined position with respect to the radiation detecting two-dimensional array 1-3. For the sake of simplicity, FIG. 9 shows only some rays of radiation. Note that the holding unit 6-3-1 is preferably a member which does not change radiation as much as possible.

Figure 10A:
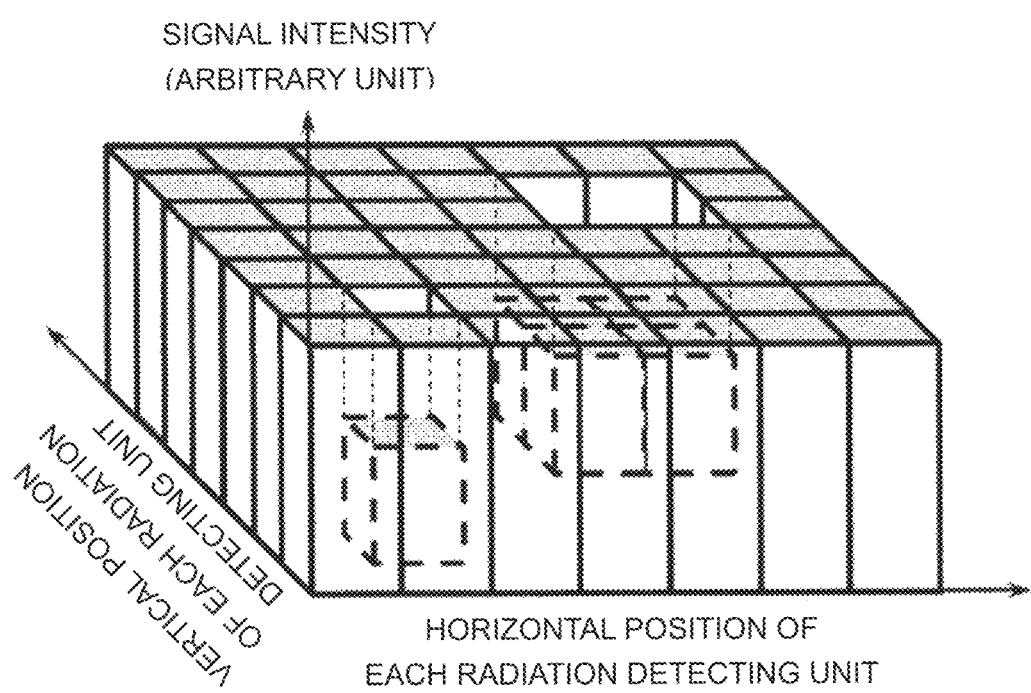
FIG. 10A shows an example of a signal amount distribution obtained in the embodiment of the present invention.
Figure 10B:
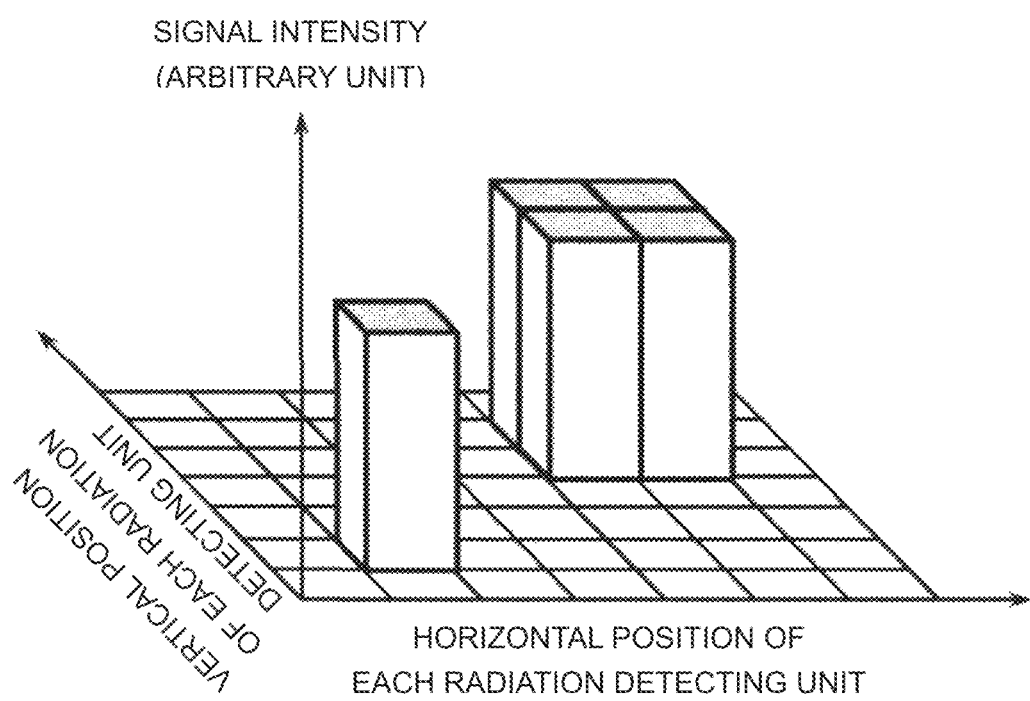
FIG. 10B shows an example of a signal amount distribution obtained in the embodiment of the present invention.

The bar chart of FIG. 10A shows signal examples respectively output from a plurality of radiation detecting units constituting the radiation detecting two-dimensional array 1-3. The bar chart of FIG. 10B shows bars respectively obtained by subtracting signal intensities respectively represented by the bars in FIG. 10A from signal intensities respectively output from the plurality of radiation detecting units constituting the two-dimensional array 1-3 in the absence of the second radiation varying unit 2-1 and multiplying the resultant values by the reciprocals of the ratios of doses changed by the second radiation varying unit 2-1.

In this case, the positions of the respective bars of the bar chart respectively correspond to the locations of the plurality of radiation detecting units constituting the radiation detecting two-dimensional array 1-3. That is, the bar chart of FIG. 10B represents a dose distribution expressed as a function of the location of each of the plurality of radiation detecting units constituting the radiation detecting two-dimensional array 1-3. In addition, the bar chart of FIG. 10B can be made to correspond to the dose distribution of the measurement region 5 by converting two abscissas in correspondence with the respective positions on the measurement region 5.

Note that referring to FIG. 9, the signal intensity of radiation detected by each radiation detecting unit of the radiation detecting two-dimensional array 1-3 in the absence of the second radiation varying unit 2-1 corresponds to a spatial dose at the measurement position of each radiation detecting unit.

In this manner, Example 3 of the dose distribution measuring device according to the present invention can measure the dose distribution of a measurement region. Note that it is possible to broaden a measurement range or increase the spatial resolution of a dose distribution by reducing the radiation varying unit, the second radiation varying unit 2-1, and the radiation detecting unit. In addition, it is possible to downsize the device by reducing the radiation varying unit, the second radiation varying unit 2-1, and the radiation detecting unit.

Note that referring to FIG. 4, when the radiation detecting unit 1 has directivity, a more accurate dose distribution can be obtained by correcting the dose distribution using the data of the directivity. The directivity of the radiation detecting unit can be obtained by moving a predetermined radiation source along a predetermined plane. For example, the directivity of the radiation detecting unit 1 can be measured by moving a predetermined radiation source along a predetermined plane, together with the second radiation varying unit 2-1, while fixing the predetermined radiation source on the radiation detecting unit 1 side of the second radiation varying unit 2-1, in a place where a low dose or uniform dose is set and any object which emits strong radiation is not present nearby. Note that the same applies when each radiation detecting unit of the radiation detecting one-dimensional array 1-2 in FIGS. 7A and 7B and each radiation detecting unit of the radiation detecting two-dimensional array 1-3 in FIG. 9 have directivities.

Example 4

Figure 11:
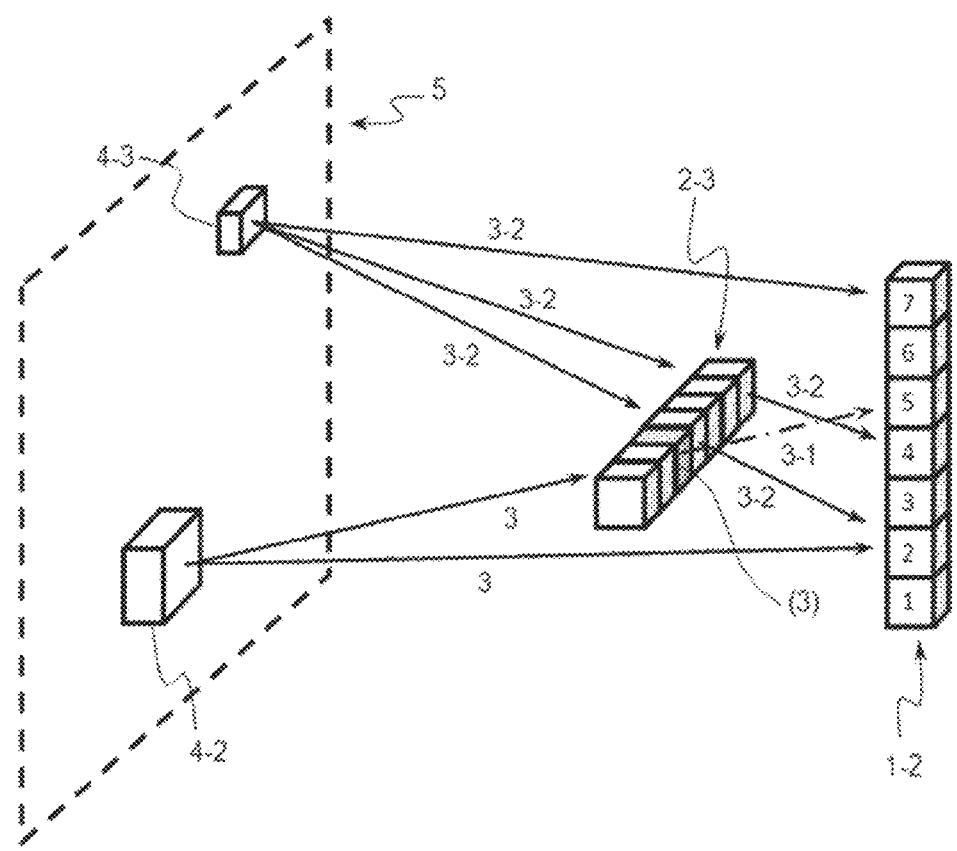
FIG. 11 is a schematic view of a structure of Example 4 of the present invention.

FIG. 11 shows Example 4 of the dose distribution measuring device according to the present invention. As shown in FIG. 11, a radiation varying unit including a spatial modulating two-dimensional array 2-2 is arranged between a radiation detecting unit 1 and objects 4-2 and 4-3 or a measurement region 5. In this case, the spatial modulating two-dimensional array 2-2 includes a plurality of spatial modulators. Each spatial modulator can switch between a state in which it outputs the same dose of radiation, in a predetermined direction, with respect to radiation entering each spatial modulator and a state in which it outputs radiation in a different state, e.g., a different dose of radiation, in a predetermined direction.

Note that each spatial modulator can realize this switching operation by, for example, opening/closing a lead window. In addition, each spatial modulator may switch between a state in which it outputs radiation in a different state, e.g., a different dose of radiation, in a predetermined direction, with respect to radiation entering each spatial demodulator and a state in which it outputs radiation in a further different state, e.g., a different dose of radiation which further differs from the above different dose of radiation, in a predetermined direction.

FIG. 11 shows a case in which spatial modulators, other than a spatial modulator at the position of (5, 3), of 7 row×7 column spatial modulators constituting the spatial modulating two-dimensional array 2-2 output the same dose of radiation in the same direction as the incident direction with respect to the incident radiation 3 or incident radiation 3-2, whereas the spatial modulator at the position of (5, 3) outputs radiation in a different state, e.g., a different dose of radiation, radiation 3-3 with respect to the radiation 3-2 in FIG. 11, in the same direction as the incident direction with respect to incident radiation.

In this case, it is therefore possible to obtain the difference between a dose detected by the radiation detecting unit 1 while all the spatial modulators are set to output the same dose of radiation in the same direction as each incident direction, and a dose detected by the radiation detecting unit 1 in the setting shown in FIG. 11. That is, the radiation detecting unit 1 can measure a dose at the location of the radiation detecting unit 1 in a state in which the direction from which radiation, which is to be measured by being varied by a predetermined change amount in accordance with the set state of the spatial modulating two-dimensional array 2-2, arrives is predetermined.

This makes it possible to calculate the dose of radiation arriving at the location of the radiation detecting unit 1 before being varied by the spatial modulating two-dimensional array 2-2 upon identifying the direction or angle from which radiation arrives at the location of the radiation detecting unit 1. That is, it is possible to measure the angular distribution of a radiation dose emitted from a measurement region to the radiation detecting unit 1 by sequentially switching spatial modulators which are set to output radiation in different states, e.g., different doses of radiation, in the same directions as incident directions with respect to incident radiation.

Example 5

Figure 12:
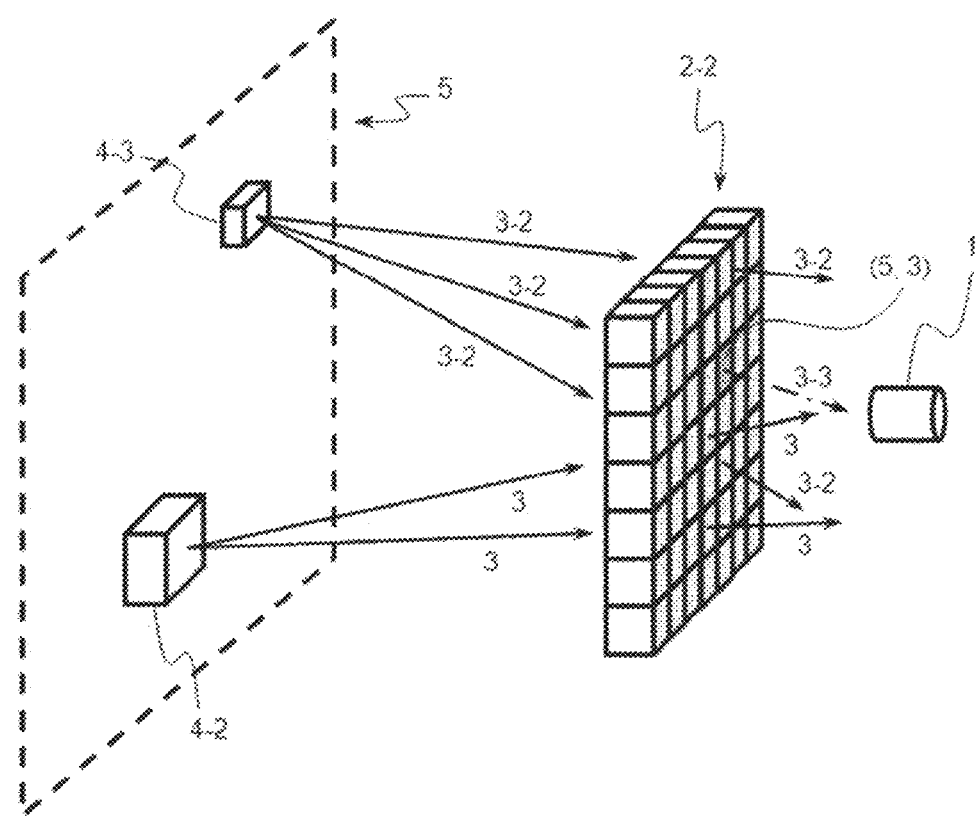
FIG. 12 is a schematic view of a structure of Example 5 of the present invention.

FIG. 12 shows Example 5 of the dose distribution measuring device according to the present invention. As shown in FIG. 12, a spatial modulating one-dimensional array 2-3 is arranged between a radiation detecting one-dimensional array 1-2 and objects 4-2 and 4-3 or a measurement region 5. In this case, the spatial modulating one-dimensional array 2-3 includes a plurality of spatial modulators. Each spatial modulator can switch between a state in which it outputs the same dose of radiation, in a predetermined direction, with respect to radiation entering each spatial modulator and a state in which it outputs radiation in a different state, e.g., a different dose of radiation, in a predetermined detection.

Note that each spatial modulator can realize this switching operation by, for example, opening/closing a lead window. In addition, each spatial modulator may switch between a state in which it outputs radiation in a different state, e.g., a different dose of radiation, in a predetermined direction, with respect to radiation entering each spatial demodulator and a state in which it outputs radiation in a further different state, e.g., a different dose of radiation which further differs from the different dose of radiation, in a predetermined direction.

FIG. 12 shows a case in which spatial modulators, other than a spatial modulator at the position of (3), of spatial modulators on seven rows constituting the spatial modulating one-dimensional array 2-3 output the same dose of radiation in the same direction as the incident direction with respect to incident radiation 3 or incident radiation 3-2, whereas the spatial modulator at the position of (3) outputs radiation 3-1 in a different state, e.g., a different dose of radiation, in the same direction as the incident direction with respect to incident radiation.

In this case, it is therefore possible to obtain the difference between a dose detected by each radiation detecting unit of the radiation detecting one-dimensional array 1-2, when all the spatial modulators are set to output the same dose of radiation in the same direction as each incident direction and a dose detected by each radiation detecting unit of the radiation detecting one-dimensional array 1-2 in the setting shown in FIG. 12. That is, each radiation detecting unit of the radiation detecting one-dimensional array 1-2 can measure a dose at the location of each radiation detecting unit of the radiation detecting one-dimensional array 1-2 in a state in which the direction from which radiation, which is to be measured by being varied by a predetermined change amount in accordance with the set state of the spatial modulating one-dimensional array 2-3, arrives is predetermined.

This makes it possible to calculate the dose of radiation arriving at the location of each radiation detector of the radiation detecting one-dimensional array 1-2 before being varied by the spatial modulating one-dimensional array 2-3 upon identifying the direction or angle from which radiation arrives at the location of each detector of the radiation detecting one-dimensional array 1-2. That is, it is possible to measure the angular distribution of a radiation dose emitted from a measurement region to the radiation detector of the radiation detecting one-dimensional array 1-2 by sequentially switching spatial modulators which are set to output radiation in different states, e.g., different doses of radiation, in the same directions as incident directions with respect to incident radiation.

Note that referring to FIG. 4 in Example 1, the effective size and shape of the second radiation varying unit 2-1 are preferably the same as or approximate to the size and shape of a side surface, of the radiation detecting unit 1, which faces the second radiation varying unit 2-1.

In addition, referring to FIG. 7 in Example 2, the effective size and shape of the second radiation varying unit 2-1 are preferably the same as or approximate to the size and shape of a side surface, of each of the plurality of radiation detectors constituting the radiation detecting one-dimensional array 1-2, which faces the second radiation varying unit 2-1.

Furthermore, referring to FIG. 9 in Example 3, the effective size and shape of the second radiation varying unit 2-1 are preferably the same as or approximate to the size and shape of a side surface, of each of the plurality of radiation detectors constituting the radiation detecting two-dimensional array 1-3, which faces the second radiation varying unit 2-1.

Note that the effective size and shape of the second radiation varying unit 2-1 mean the size and shape of a cross-section, of the second radiation varying unit 2-1, which is perpendicular to a line connecting the second radiation varying unit 2-1 to the radiation detecting unit 1.

Note that referring to FIG. 11 in Example 4, the effective size and shape of each spatial modulator of the spatial modulating two-dimensional array 2-2 are preferably the same as or approximate to the size and shape of a side surface, of the radiation detecting unit 1, which faces the spatial modulating two-dimensional array 2-2.

Note that the effective size and shape of each spatial modulator of the spatial modulating two-dimensional array 2-2 mean the size and shape of a cross-section, of each spatial modulator of the spatial modulating two-dimensional array 2-2, which is perpendicular to a line connecting each spatial modulator of the spatial modulating two-dimensional array 2-2 to the radiation detecting unit 1.

Note that referring to FIG. 12 in Example 5, the effective size and shape of each spatial modulator of the spatial modulating one-dimensional array 2-3 are preferably the same as or approximate to the size and shape of a side surface, of each angular radiation detector of the radiation detecting one-dimensional array 1-2, which faces the spatial modulating one-dimensional array 2-3.

Note that the effective size and shape of each spatial modulator of the spatial modulating one-dimensional array 2-3 mean the size and shape of a cross-section, of each spatial modulator of the spatial modulating one-dimensional array 2-3, which is perpendicular to a line connecting each spatial modulator of the spatial modulating one-dimensional array 2-3 to each detector of the radiation detecting one-dimensional array 1-2.

In addition, referring to FIG. 4 in Example 1, the radiation detecting unit 1 is preferably covered by a radiation shielding portion except for a side surface facing the second radiation varying unit 2-1.

In addition, referring to FIG. 7 in Example 2, each radiation detector of the radiation detecting one-dimensional array 1-2 is preferably covered by a radiation shielding member except for a side surface facing the second radiation varying unit 2-1.

In addition, referring to FIG. 9 in Example 3, each radiation detector of the radiation detecting two-dimensional array 1-3 is preferably covered by a radiation shielding member except for a side surface facing the second radiation varying unit 2-1.

In addition, referring to FIG. 11 in Example 4, the radiation detecting unit 1 is preferably covered by a radiation shielding portion except for a side surface facing the spatial modulating two-dimensional array 2-2.

In addition, referring to FIG. 12 in Example 5, each radiation detector of the radiation detecting one-dimensional array 1-2 is preferably covered by a radiation shielding portion except for a side surface facing the spatial modulating one-dimensional array 2-3.

When the ratio between the detection sensitivity of a radiation detecting unit in the presence of a radiation shielding member and the detection sensitivity of the radiation detecting unit in the absence of the radiation shielding member is measured in advance, even if there is the radiation shielding member, a spatial dose in the absence of the radiation shielding member can be obtained by converting a signal output from the radiation detecting unit based on the measurement. That is, using the dose distribution measuring device according to the present invention obviates the necessity to separately measure a spatial dose using a spatial dosed measuring device.

Note that this device preferably includes one or both of a visible light camera and an infrared camera and captures one or both of a visible light image and an infrared image of a measurement region.

Note that this device preferably includes a distance meter, measures the distance between a radiation detecting unit and a measurement region, and calculates the dose of radiation emitted from each position on the measurement region, thereby obtaining the dose distribution of the measurement region.

Note that this device preferably includes a radiation spectrum analyzing unit and identifies a radioactive substance contained at each position on the measurement region.

Note that this device preferably includes a display unit and displays a composite image by combining a dose distribution and one or both of a visible light image and an infrared image.

Note that this device preferably includes a radiation spectrum analyzing unit, identifies a radioactive substance contained at each position on a measurement region, and displays the name of the identified radioactive substance on the composite image.

Note that this device preferably includes a GPS and measures a measurement position.

Example 6

Figure 13:
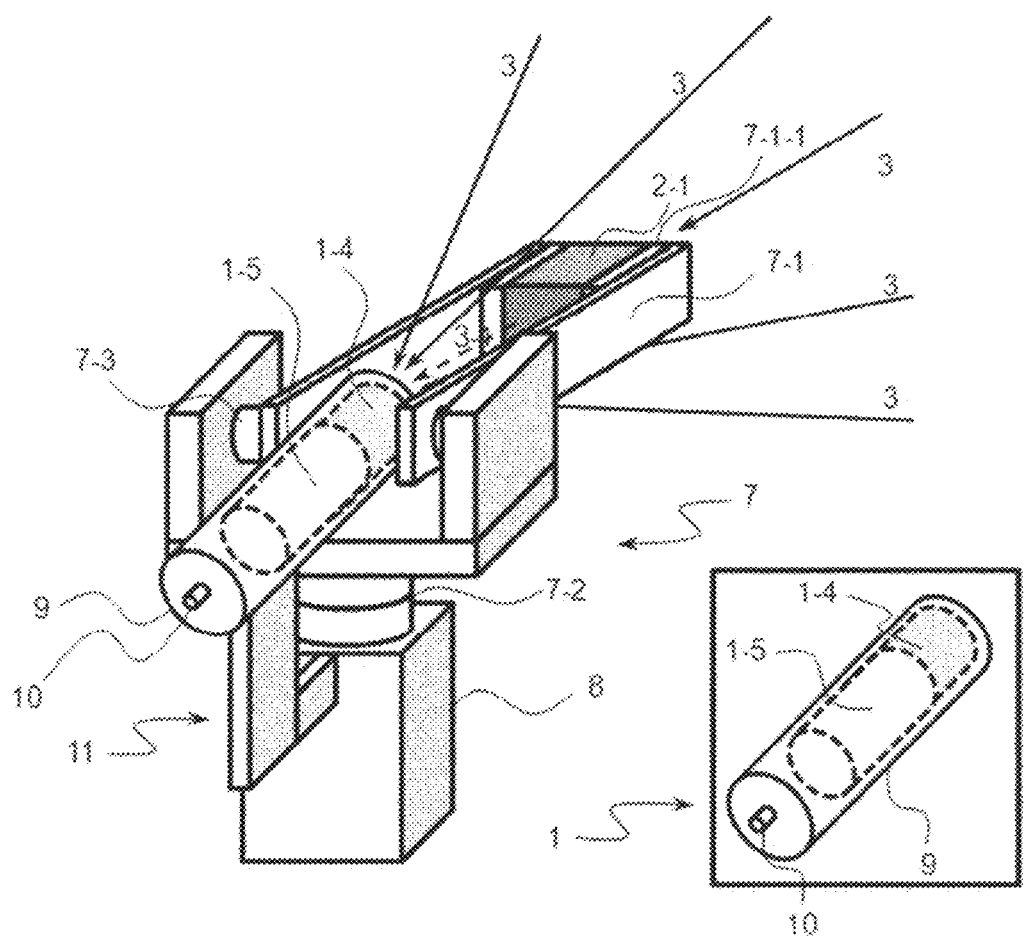
FIG. 13 is a schematic view of a structure of Example 6 of the present invention.

FIG. 13 shows Example 6 of the dose distribution measuring device according to the present invention. In this case, a radiation varying unit includes a second radiation varying unit 2-1 and a swivel 7. The second radiation varying unit 2-1 is fixed to an arm 7-1 of the swivel 7 through a pressing portion 7-1-1, and can be moved along predetermined planes with respect to a base 8 and a radiation detecting unit 1 by a horizontal rotating mechanism 7-2 and a vertical rotating mechanism 7-3.

Note that the second radiation varying unit 2-1 is arranged between the radiation detecting unit 1, which has a scintillator 1-4 installed at a front portion of a photomultiplier tube 1-5, and a measurement region located in the upper right direction in this figure.

In addition, the radiation detecting unit 1 is fixed to the base 8 with a holding beam 11. The radiation detecting unit 1 outputs a radiation detection signal from an output terminal 10. Note that an illustration of wirings and the like inside the radiation detecting unit 1 is omitted. In addition, for the sake of simplicity, this figure shows only some rays of radiation.

Note that the arm 7-1 and the pressing portion 7-1-1 are preferably members which do not change radiation as much as possible.

Example 7

Figure 14:
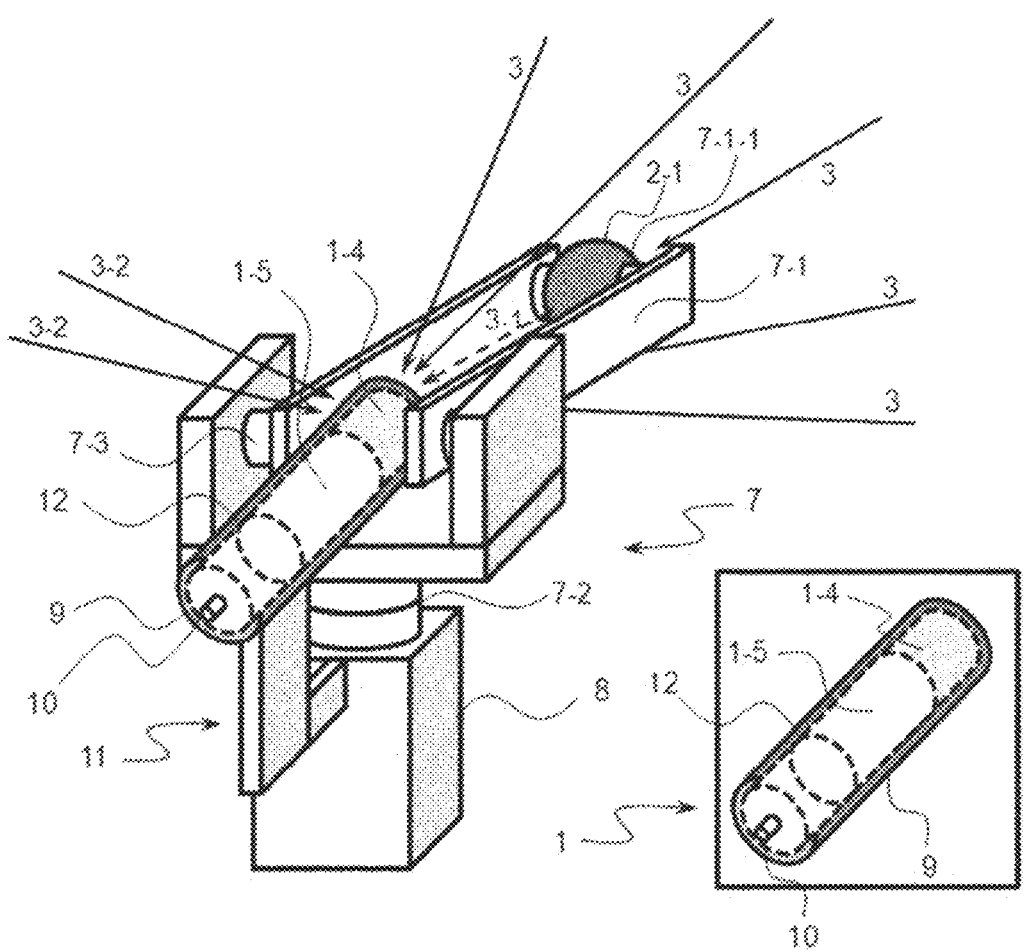
FIG. 14 is a schematic view of a structure of Example 7 of the present invention.

FIG. 14 shows Example 7 of the dose distribution measuring device according to the present invention. Although FIG. 14 is similar to FIG. 13, FIG. 14 shows a structure example in which a radiation detecting unit 1 is covered by a radiation shielding member 12 except for a side surface, of the radiation detecting unit 1, facing a radiation varying unit or a second radiation varying unit 2-1 and a portion around an output terminal 10. In addition, the second radiation varying unit 2-1 has a spherical shape.

In this case, the radiation detecting unit 1 can be shielded against radiation other than radiation from a measurement region, e.g., radiation 3-2. This can obtain a dose distribution with high contrast. For the sake of simplicity, FIG. 14 shows only some rays of radiation necessary for explanation.

Note that the radiation shielding member is preferably shaped to completely cover the radiation detecting unit except for the side surface facing the radiation varying unit or the second radiation varying unit 2-1 so as to make the radiation detecting unit have sensitivity or directivity only in the direction of a measurement region. As shown in FIG. 14, however, a portion around the output terminal 10 may not be covered by the radiation shielding member.

Example 8

Figure 15:
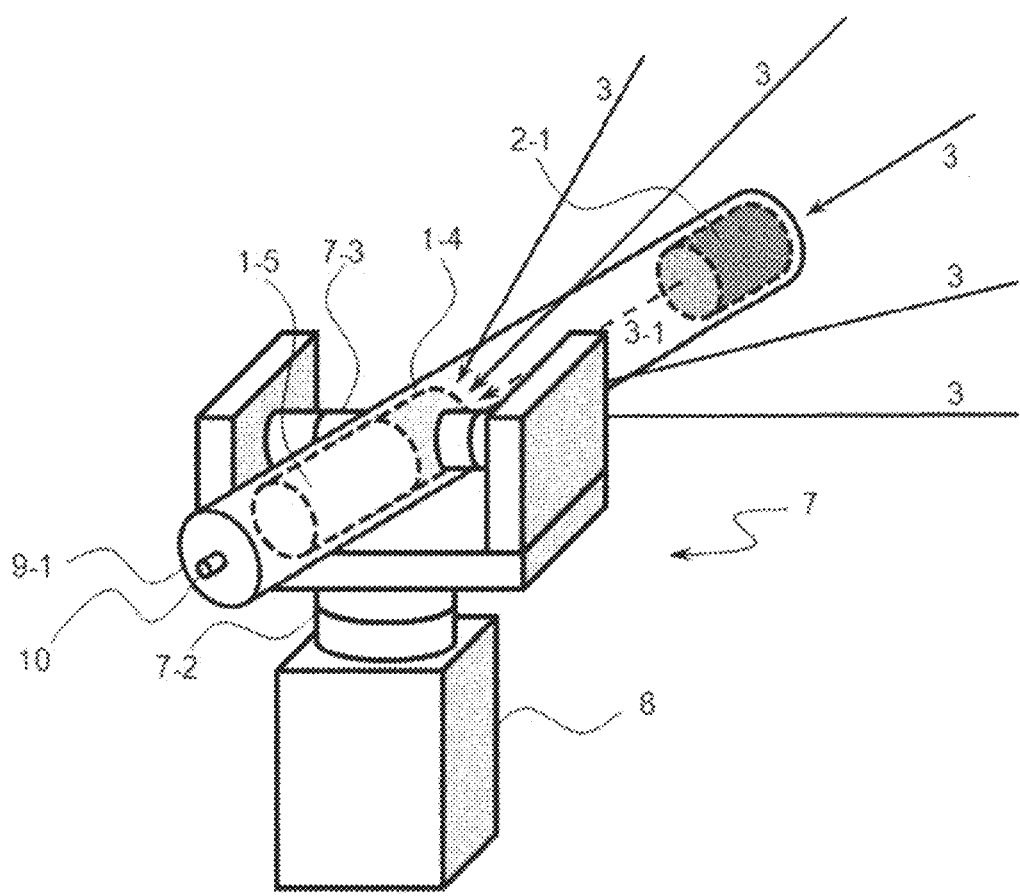
FIG. 15 is a schematic view of a structure of Example 8 of the present invention.

FIG. 15 shows Example 8 of the dose distribution measuring device according to the present invention. FIG. 15 shows an example in which a second radiation varying unit 2-1, and a scintillator 1-4 and a photomultiplier tube 1-5 constituting a radiation detecting unit 1 are incorporated in one case 9-1. In this case, the case 9-1 is fixed to one end of a vertical rotating mechanism 7-3 of a swivel 7 at a position where the scintillator 1-4 is incorporated, and allows the second radiation varying unit 2-1 to be moved along a predetermined curved surface with respect to a base 8 by a horizontal rotating mechanism 7-2 and the vertical rotating mechanism 7-3. For the sake of simplicity, FIG. 15 shows only some rays of radiation.

Note that the case 9-1 is preferably a member which does not shield against radiation.

Note that since the rotation of the scintillator 1-4 arranged at the center of movement of the swivel 7 is sufficiently smaller than the moving amount of the second radiation varying unit 2-1, it is not always necessary to correct directivity but it is preferable to correct directivity.

Note that the second radiation varying unit 2-1 may have a square shape such as a cubic shape or rectangular parallelepiped shape as shown in FIG. 13, a spherical shape as shown in FIG. 14, or a cylindrical shape as shown in FIG. 15.

Example 9

Figure 16:
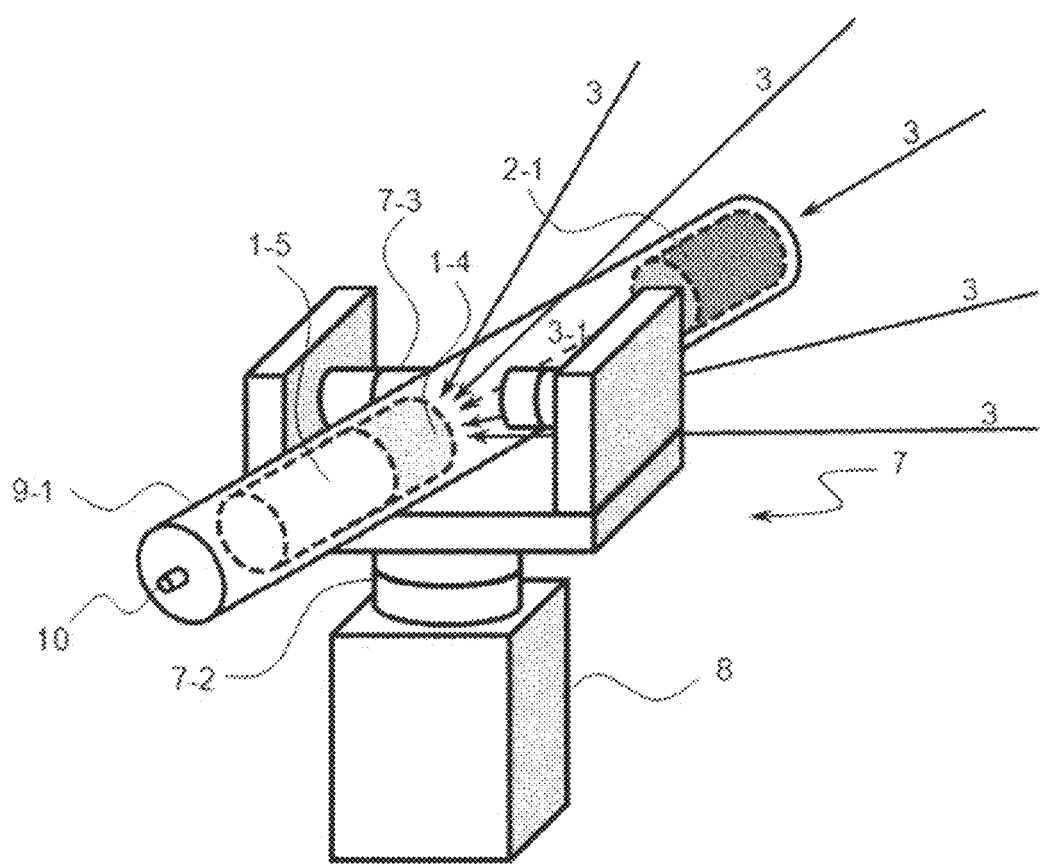
FIG. 16 is a schematic view of a structure of Example 9 of the present invention.

FIG. 16 shows Example 9 of the dose distribution measuring device according to the present invention. Note that unlike FIG. 15, FIG. 16 shows an arrangement in which a scintillator 1-4 is set at a position away from the center of movement of a swivel 7. In this case, therefore, as a second radiation varying unit 2-1 moves along a predetermined plane, the location of a radiation detecting unit 1 also moves along another predetermined plane. Note that if the radiation detecting unit 1 has no directivity or a measurement region is located far from it, it is not always necessary to correct directivity but it is preferable to correct directivity. For the sake of simplicity, FIG. 16 shows only some rays of radiation.

Note that a case 9-1 can be moved more stably or without imposing large load on the swivel 7 by setting the holding position of the case 9-1 by a vertical rotating mechanism 7-3 at the barycentric position of a case 9 including the second radiation varying unit 2-1 and the radiation detecting unit 1.

Example 10

Figure 17:
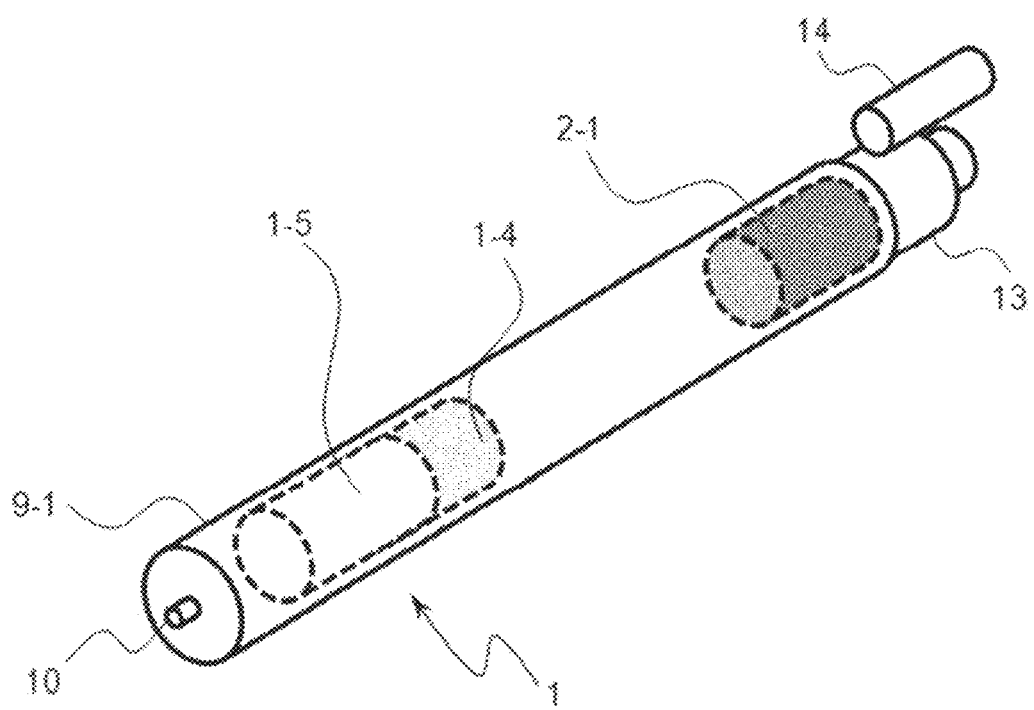
FIG. 17 is a schematic view of a structure of Example 10 of the present invention.

FIG. 17 shows Example 10 of the dose distribution measuring device according to the present invention. As shown in FIG. 17, this device includes a camera 13 and can capture a visible light image of a measurement region. Note that the camera 13 may be a visible light camera, an infrared camera, or a camera having sensitivity to both the wavelength regions of visible light and infrared light. This makes it possible to compare the dose distribution of radiation with a visible light image or infrared image and also combine them.

Although the camera 13 is preferably arranged near a scintillator 1-4 of a radiation detecting unit 1, the camera 13 may be arranged near a second radiation varying unit 2-1, as shown in FIG. 17. For the sake of simplicity, FIG. 17 omits an illustration of radiation.

In addition, as shown in FIG. 17, this device preferably includes a distance meter 14. In this case, since the distance from the scintillator 1-4 of the radiation detecting unit 1 to a measurement region can be measured, the dose of radiation emitted from the measurement region can be calculated. Note that the distance meter is, for example, a laser distance meter or ultrasonic distance meter. In addition, the distance meter 14 may be installed near the second radiation varying unit 2-1, as shown in FIG. 17.

Example 11

Figure 18:
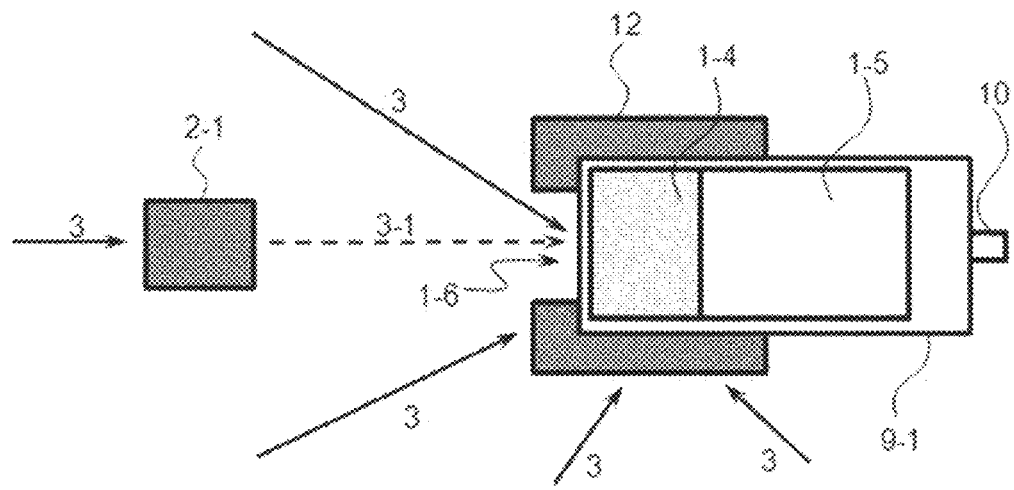
FIG. 18 is a schematic view of a structure of Example 11 of the present invention.

FIG. 18 shows Example 11 of the dose distribution measuring device according to the present invention. As shown in FIG. 18, a scintillator 1-4 of a radiation detecting unit is almost entirely covered by a radiation shielding member 12. However, a side surface 1-6 facing the radiation varying unit or a second radiation varying unit 2-1 of the scintillator 1-4 is not covered by the radiation shielding member 12.

Although the scintillator 1-4 and a photomultiplier tube 1-5 of the radiation detecting unit are preferably entirely covered by the radiation shielding member 12, the scintillator 1-4 may be almost entirely covered by the radiation shielding member 12, as shown in FIG. 18.

In this case, when measuring a radiation distribution on the ground from the air or sky, since the amount of radiation arriving from a direction opposite to a plane facing the side surface 1-6, i.e., the air or sky, at the scintillator 1-4 is smaller than the amount of radiation arriving from the ground, even the arrangement shown in FIG. 18 does not decrease the contrast of a signal. For the sake of simplicity, FIG. 18 shows only some rays of radiation.

In addition, as shown in FIG. 18, the effective size and shape of the second radiation varying unit 2-1 are preferably the same as or approximate to the size and shape of the side surface 1-6. This is because if the effective size of the second radiation varying unit 2-1 is too larger than the size of the side surface 1-6, the spatial resolution of an obtained dose distribution decreases.

Note that the effective size and shape of the second radiation varying unit 2-1 mean the size and shape of a cross-section, of the second radiation varying unit 2-1, which is perpendicular to a line connecting the second radiation varying unit 2-1 to the radiation detecting unit 1.

In contrast, if the effective size of the second radiation varying unit 2-1 is too smaller than the size of the side surface 1-6, although the spatial resolution increases, the contrast of a dose distribution decreases because it becomes difficult to vary radiation from an object which emits radiation. Especially, the contrast of a dose distribution considerably decreases with respect to a remote measurement object.

Note that the shape of the side surface 1-6 or the effective shape of the second radiation varying unit 2-1, that is, the cross-sectional shape of the second radiation varying unit 2-1 which is perpendicular to a line connecting the second radiation varying unit 2-1 to the side surface 1-6, may be circular, square, or polygonal.

Figure 19:
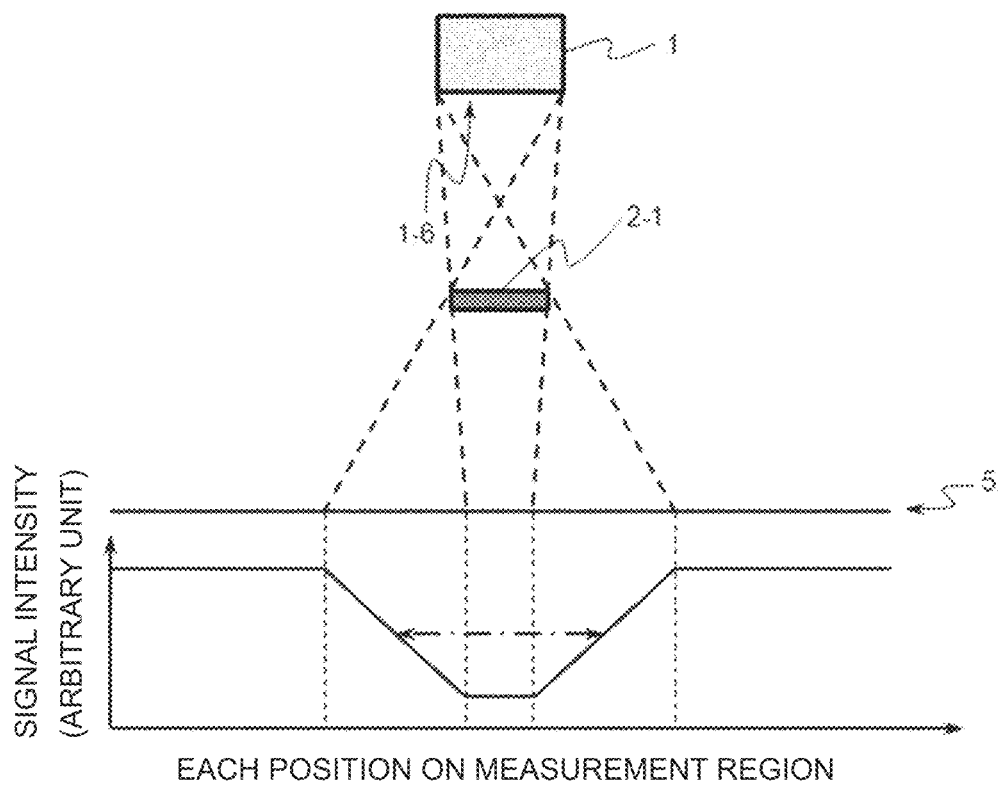
FIG. 19 is a view for explaining a resolution associated with the embodiment of the present invention.

FIG. 19 is a view for explaining a spatial resolution. FIG. 19 shows a case in which the effective size and shape of the second radiation varying unit 2-1 are approximate to the size and shape of the side surface 1-6 of the radiation detecting unit 1. Note that the spatial resolution of a measurement signal in a measurement region as indicated by the chain line with arrows at both ends is determined by the effective size and shape of the second radiation varying unit 2-1, the size and shape of the side surface 1-6 of the radiation detecting unit 1, and their geometrical arrangement.

Experimental Example 1

Figure 20:
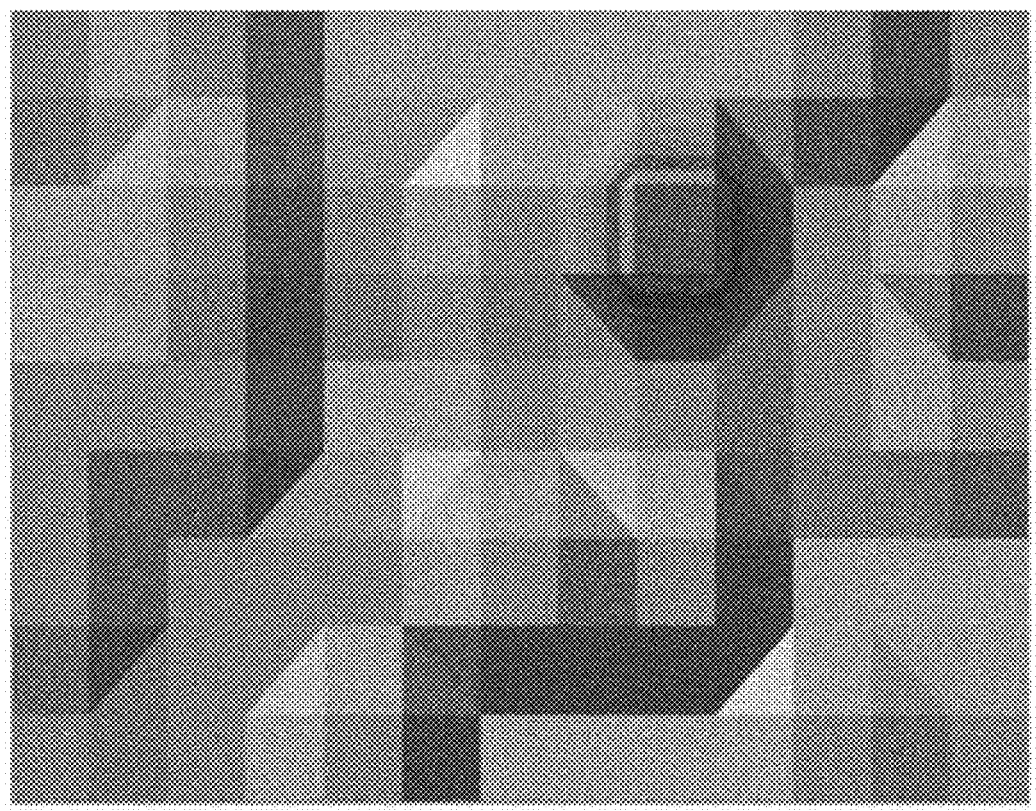
FIG. 20 is a view showing measurement data obtained by Experimental Example 1 according to the embodiment of the present invention.

FIG. 20 shows Experimental Example 1 conducted by the dose distribution measuring device according to the present invention. In this case, FIG. 20 shows a measurement result in a case in which the second radiation varying unit is arranged between the radiation detecting unit and an object or measurement region, with the dose (μSv/hr) of radiation being represented by contour lines.

In addition, measurement is performed while the second radiation varying unit is moved so as to make the original number of effective pixels of an obtained dose distribution become 5×7, and interpolation pixels are inserted between the effective pixels, thereby implementing 9×13 pixel display as a whole, as shown in FIG. 20.

Note that the distance between the radiation detecting unit and the measurement region was about 200 mm, and the distance between the second radiation varying unit and the measurement region was about 100 mm. In addition, the measurement region had a width of about 280 mm and a length of about 200 mm.

In this case, FIG. 20 shows, as an object which emits radiation, a portion located nearly the upper right of the center, which exhibits the highest dose of radiation compared with the remaining places, indicating the dose distribution of radiation emitted from the measurement region. Note that the object which emits radiation in this case is thorium-232.

Note that the highest dose of radiation at the location of the radiation detecting unit was about 0.09 μSv/hr, and the dose of radiation in the remaining regions was 0.06 μSv/hr.

Experimental Example 2

Figure 21:
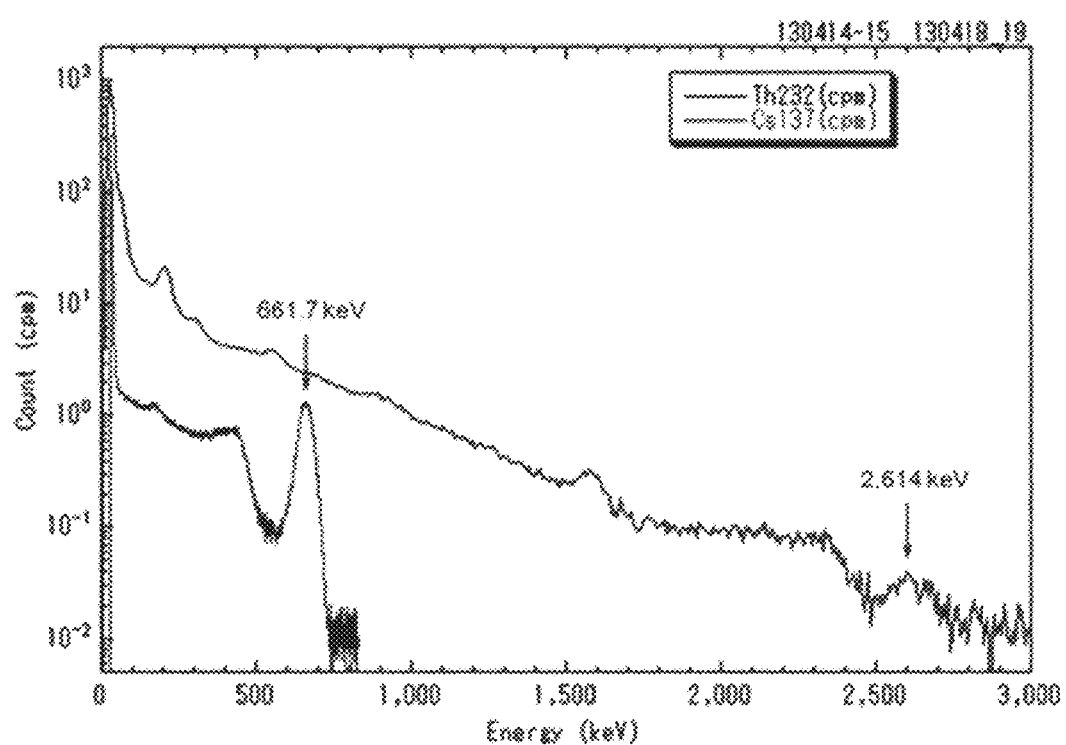
FIG. 21 is a view showing measurement data obtained by Experimental Example 2 according to the embodiment of the present invention.

FIG. 21 shows Experimental Example 2 of the dose distribution measuring device according to the present invention. In this case, FIG. 21 shows the results obtained by respectively measuring thorium-232 and cesium-137 as objects which emit radiation, indicating that the energy spectra of the respective substances were able to be measured.

The present invention can measure the dose distribution and energy spectra of radiation emitted from a measurement region.

REFERENCE SIGNS LIST

1 . . . radiation detecting unit, 1-2 . . . radiation detecting one-dimensional array, 1-3 . . . radiation detecting two-dimensional array, 1-4 . . . scintillator, 1-5 . . . photomultiplier tube, 1-6 . . . side surface, 2 . . . radiation varying unit, 2-1 . . . second radiation varying unit, 2-2 . . . spatial modulating two-dimensional array, 2-3, spatial modulating one-dimensional array, 3 . . . radiation, 3-1 . . . radiation, 3-2 . . . radiation, 3-3 . . . radiation, 4 . . . object, 4-2 . . . object, 4-3 . . . object, 5 . . . measurement region, 6 . . . moving means, 6-1 . . . horizontal moving unit, 6-1-1 . . . horizontal moving guide, 6-1-2 . . . holding unit, 6-2 . . . vertical moving portion, 6-2-1 . . . vertical moving guide, 6-3-1 . . . holding unit, 7 . . . swivel, 7-1 . . . arm, 7-1-1 . . . pressing portion, 7-2 . . . horizontal rotating mechanism, 7-3 . . . vertical rotating mechanism, 8 . . . base, 9 . . . case, 9-1 . . . case, 10 . . . output terminal, 11 . . . holding beam, 12 . . . radiation shielding member, 13 . . . camera, 14 . . . distance meter

The invention claimed is:

1. A dose distribution measuring device comprising:
a radiation detecting unit and;
a radiation varying unit arranged between the radiation detecting unit and a region to be measured, the radiation varying unit varying the strength of radiation from the region to be measured,
wherein
a dose at a location of the radiation detecting unit is measured by the radiation detecting unit,
in a state in which a direction of a radiation, of which a dose is to be varied by the radiation varying unit and measured, is predetermined and,
a dose angular distribution of a radiation emitted from the region to be measured toward the radiation detecting unit is measured,
by way in which the direction or an angle, where the radiation arrives to the radiation detecting unit from the region to be measured, is identified and a dose of the radiation before being varied by the radiation varying unit is calculated as a difference from a dose measured by the radiation detecting unit in the case where the radiation varying unit is not arranged.

2. The dose distribution measuring device according to claim 1, wherein the radiation varying unit comprises a second radiation varying unit and a moving means for two-dimensionally moving the second radiation varying unit, and
the moving means two-dimensionally moves the second radiation varying unit.

3. The dose distribution measuring device according to claim 2, wherein an effective size and an effective shape of the second radiation varying unit are the same as or approximate to a size and a shape of a side surface of the radiation detecting unit, the side surface facing the second radiation varying unit.

4. The dose distribution measuring device according to claim 3, further comprising a radiation shielding portion,
wherein the radiation detecting unit is covered by the radiation shielding portion except for a side surface of the radiation detecting unit, the side surface facing the second radiation varying unit.

5. The dose distribution measuring device according to claim 2, further comprising a radiation shielding portion,
wherein the radiation detecting unit is covered by the radiation shielding portion except for a side surface of the radiation detecting unit, the side surface facing the second radiation varying unit.

6. The dose distribution measuring device according to claim 1, wherein the radiation varying unit comprises a second radiation varying unit and a moving means for one-dimensionally moving the second radiation varying unit,
the radiation detecting unit comprises a radiation detecting one-dimensional array constituted by a plurality of radiation detectors linearly arranged, and
the moving means one-dimensionally moves the second radiation varying unit.

7. The dose distribution measuring device according to claim 6, wherein an effective size and an effective shape of the second radiation varying unit are the same as or approximate to a size and a shape of a side surface of the radiation detector, the side surface facing the second radiation varying unit.

8. The dose distribution measuring device according to claim 7, further comprising a radiation shielding portion,
wherein the radiation detector is covered by the radiation shielding portion except for a side surface of the radiation detector, the side surface facing the second radiation varying unit.

9. The dose distribution measuring device according to claim 6, further comprising a radiation shielding portion,
wherein the radiation detector is covered by the radiation shielding portion except for a side surface of the radiation detector, the side surface facing the second radiation varying unit.

10. The dose distribution measuring device according to claim 1, wherein the radiation varying unit comprises a second radiation varying unit and a fixing unit,
the radiation detecting unit comprises a radiation detecting two-dimensional array constituted by a plurality of radiation detectors planarly arranged, and
the fixing unit fixes the second radiation varying unit.

11. The dose distribution measuring device according to claim 10, wherein an effective size and an effective shape of the second radiation varying unit are the same as or approximate to a size and a shape of a side surface of each radiation detector constituting the radiation detecting two-dimensional array, the side surface facing the second radiation varying unit.

12. The dose distribution measuring device according to claim 11, further comprising a radiation shielding portion,
wherein the radiation detector is covered by the radiation shielding portion except for a side surface of the radiation detector, the side surface facing the second radiation varying unit.

13. The dose distribution measuring device according to claim 10, further comprising a radiation shielding portion,
wherein the radiation detector is covered by the radiation shielding portion except for a side surface of the radiation detector, the side surface facing the second radiation varying unit.

14. The dose distribution measuring device according to claim 1, wherein the radiation varying unit comprises a spatial modulating two-dimensional array constituted by a plurality of spatial modulators planarly arranged, and
the spatial modulating two-dimensional array changes a dose of radiation detected by the radiation detecting unit.

15. The dose distribution measuring device according to claim 14, further comprising a radiation shielding portion,
wherein the radiation detecting unit is covered by the radiation shielding portion except for a side surface of the radiation detecting unit, the side surface facing the spatial modulating two-dimensional array.

16. The dose distribution measuring device according to claim 1, wherein the radiation varying unit comprises a spatial modulating one-dimensional array constituted by a plurality of spatial modulators linearly arranged,
the radiation detecting unit comprises a radiation detecting one-dimensional array, and
the spatial modulating one-dimensional array changes a dose of radiation detected by the radiation detecting one-dimensional array.

17. The dose distribution measuring device according to claim 16, further comprising a radiation shielding portion,
wherein each detector of the radiation detecting one-dimensional array is covered by the radiation shielding portion except for a side surface of each detector, the side surface facing the spatial modulating one-dimensional array.

18. The dose distribution measuring device according to claim 1, further comprising one or both of a visible light camera and an infrared camera,
wherein one or both of a visible light image and an infrared image of the region to be measured are captured by one or both of the visible light camera and the infrared camera.

19. The dose distribution measuring device according to claim 1, further comprising a distance meter,
wherein a distance between the radiation detecting unit and the region to be measured is measured by the distance meter, and a dose distribution of the region to be measured is obtained by calculating a dose of radiation emitted from each position on the region to be measured.

20. The dose distribution measuring device according to claim 19, further comprising a display unit combining the dose distribution and one or both of the visible light image and the infrared image and displaying a composite image.

21. The dose distribution measuring device according to claim 20, further comprising a radiation spectrum analyzing unit,
wherein a radioactive substance contained at each position on the region to be measured is identified by the radiation spectrum analyzing unit, and
an identified name of the radioactive substance is displayed on the composite image.

22. The dose distribution measuring device according to claim 1, further comprising a radiation spectrum analyzing unit,
wherein a radioactive substance contained at each position on the region to be measured is identified by the radiation spectrum analyzing unit.

23. The dose distribution measuring device according to claim 1, further comprising a GPS,
wherein a measurement position is measured by the GPS.

* * * * *